(12) United States Patent
Vilcauskas, Jr. et al.

(10) Patent No.: US 7,353,229 B2
(45) Date of Patent: Apr. 1, 2008

(54) POST-SESSION INTERNET ADVERTISING SYSTEM

(76) Inventors: Andrew J. Vilcauskas, Jr., 7305 SW. Delaware Cir., Tualatin, OR (US) 97062; Robert D. Bloodgood, III, 236 SE. 90th, Portland, OR (US) 97216; Matthew G. Middleton, 14880 NW. Fawnlily Dr., Portland, OR (US) 97229

( * ) Notice: Subject to any disclaimer, the term of this patent is extended or adjusted under 35 U.S.C. 154(b) by 0 days.

(21) Appl. No.: 09/866,425

(22) Filed: May 24, 2001

(65) Prior Publication Data

US 2002/0019834 A1  Feb. 14, 2002

Related U.S. Application Data

(60) Provisional application No. 60/207,698, filed on May 26, 2000.

(51) Int. Cl.
*G06F 17/30* (2006.01)
*G06F 7/00* (2006.01)

(52) U.S. Cl. ............... 707/10; 707/104.1; 715/513; 715/802; 719/318; 705/1

(58) Field of Classification Search ............... 705/14; 707/1–5, 10; 715/764, 767, 778, 790–797, 715/808

See application file for complete search history.

(56) References Cited

U.S. PATENT DOCUMENTS

| | | | |
|---|---|---|---|
| 4,782,463 A | 11/1988 | Sanders et al. | 717/109 |
| 4,827,508 A | 5/1989 | Shear | 705/53 |
| 4,833,308 A | 5/1989 | Humble | 235/383 |

(Continued)

FOREIGN PATENT DOCUMENTS

GB    2281434    3/1995

(Continued)

OTHER PUBLICATIONS

Tetrode, M. "Question Two Windows", discussion thread from the newsgroup comp.lang.javascript, Aug. 26, 1996.*

(Continued)

*Primary Examiner*—Luke S Wassum
(74) *Attorney, Agent, or Firm*—Chernoff, Vilhauer, McClung & Stenzel

(57) ABSTRACT

The present invention is directed to a post-session advertising system that may be used in media such as computers, personal digital assistants, telephones, televisions, radios, and similar devices. In one preferred embodiment, a first display is viewed in a first platform in the foreground of a media by a viewer. A viewer initiates a load triggering event and in response, a post-session platform is opened to display a post-session display in the background of the media. Significantly, in the preferred embodiment, the post-session platform stays in said background until a view triggering event occurs. The type of platform and display used will depend significantly on the media. In one preferred embodiment of the present invention an optional focus timer is activated by the view triggering event to allow an accurate assessment of the actual time a viewer focuses on the display in the post-session platform. In another alternate preferred embodiment of the present invention, the number of post-session platforms is limited to, for example, one platform.

22 Claims, 11 Drawing Sheets

U.S. PATENT DOCUMENTS

| | | | |
|---|---|---|---|
| 4,850,007 A | 7/1989 | Marino et al. ............. | 379/114.13 |
| 4,873,662 A | 10/1989 | Sargent ........................ | 711/200 |
| 4,953,209 A | 8/1990 | Ryder, Sr. et al. ............ | 705/59 |
| 5,027,400 A | 6/1991 | Baji et al. .................... | 725/116 |
| 5,093,718 A | 3/1992 | Hoarty et al. ................ | 725/120 |
| 5,105,184 A | 4/1992 | Pirani et al. ................. | 345/629 |
| 5,204,947 A | 4/1993 | Bernstein et al. ........... | 715/854 |
| 5,220,420 A | 6/1993 | Hoarty et al. ................ | 725/119 |
| 5,305,195 A * | 4/1994 | Murphy ........................ | 715/500 |
| 5,321,740 A | 6/1994 | Gregorek et al. ........ | 379/88.22 |
| 5,325,423 A | 6/1994 | Lewis ....................... | 379/93.08 |
| 5,327,554 A | 7/1994 | Palazzi, III et al. ......... | 725/110 |
| 5,347,632 A | 9/1994 | Filepp et al. ................ | 709/202 |
| 5,355,472 A | 10/1994 | Lewis .......................... | 707/101 |
| 5,359,708 A | 10/1994 | Bloomer et al. ............. | 715/524 |
| 5,367,621 A | 11/1994 | Cohen et al. ............. | 715/501.1 |
| 5,367,623 A | 11/1994 | Iwai et al. .................... | 715/776 |
| 5,408,659 A | 4/1995 | Cavendish et al. .......... | 717/107 |
| 5,412,772 A | 5/1995 | Monson ........................ | 715/746 |
| 5,428,529 A | 6/1995 | Hartick et al. ............... | 715/513 |
| 5,428,670 A | 6/1995 | Gregorek et al. ........... | 379/67.1 |
| 5,438,508 A | 8/1995 | Wyman .......................... | 705/8 |
| 5,442,771 A | 8/1995 | Filepp et al. ................ | 709/219 |
| 5,461,667 A | 10/1995 | Remillard ................. | 379/93.24 |
| 5,491,820 A | 2/1996 | Belove et al. ................... | 707/3 |
| 5,511,160 A | 4/1996 | Robson ........................ | 345/501 |
| 5,515,490 A | 5/1996 | Buchaman et al. ....... | 715/500.1 |
| 5,530,754 A | 6/1996 | Garfinkle ........................ | 725/8 |
| 5,548,745 A | 8/1996 | Egan et al. ..................... | 703/27 |
| 5,557,658 A | 9/1996 | Gregorek et al. ........ | 379/88.25 |
| 5,572,643 A * | 11/1996 | Judson ........................ | 345/738 |
| 5,617,565 A | 4/1997 | Augenbraun et al. ........... | 707/4 |
| 5,623,589 A | 4/1997 | Needham et al. ........... | 715/853 |
| 5,623,656 A | 4/1997 | Lyons .......................... | 707/10 |
| 5,630,139 A | 5/1997 | Ozaki ......................... | 717/167 |
| 5,706,502 A | 1/1998 | Foley et al. ................. | 707/10 |
| 5,737,619 A * | 4/1998 | Judson ........................ | 715/500 |
| 5,740,549 A | 4/1998 | Reilly et al. .................... | 705/14 |
| 5,742,768 A | 4/1998 | Gennaro et al. ............. | 709/218 |
| 5,754,830 A | 5/1998 | Butts et al. .................. | 719/311 |
| 5,768,508 A | 6/1998 | Eikeland ...................... | 709/202 |
| 5,781,894 A | 7/1998 | Petrecca et al. .............. | 705/14 |
| 5,784,058 A * | 7/1998 | LaStrange et al. ........... | 345/738 |
| 5,796,952 A * | 8/1998 | Davis et al. ................. | 709/224 |
| 5,805,815 A | 9/1998 | Hill .............................. | 709/218 |
| 5,809,242 A * | 9/1998 | Shaw et al. .................. | 709/217 |
| 5,838,790 A * | 11/1998 | McAuliffe et al. ........... | 713/176 |
| 5,848,397 A * | 12/1998 | Marsh et al. ................. | 705/14 |
| 5,854,897 A | 12/1998 | Radziewicz et al. ........ | 709/224 |
| 5,890,172 A | 3/1999 | Borman et al. ........... | 715/501.1 |
| 5,913,040 A * | 6/1999 | Rakavy et al. .............. | 709/232 |
| 5,918,239 A * | 6/1999 | Allen et al. .................. | 715/526 |
| 5,933,811 A | 8/1999 | Angles et al. ................. | 705/14 |
| 5,937,392 A * | 8/1999 | Alberts ........................ | 705/14 |
| 5,948,061 A * | 9/1999 | Merriman et al. ........... | 709/219 |
| 5,959,623 A * | 9/1999 | van Hoff et al. ............. | 715/719 |
| 5,996,007 A * | 11/1999 | Klug et al. .................. | 709/218 |
| 6,011,537 A * | 1/2000 | Slotznick .................... | 715/733 |
| 6,014,502 A * | 1/2000 | Moraes ....................... | 709/219 |
| 6,084,628 A | 7/2000 | Sawyer ........................ | 725/34 |
| 6,118,449 A | 9/2000 | Rosen et al. ................. | 345/861 |
| 6,119,098 A | 9/2000 | Guyot et al. .................. | 705/14 |
| 6,148,332 A | 11/2000 | Brewer et al. ............... | 709/218 |
| 6,205,432 B1 * | 3/2001 | Gabbard et al. .............. | 705/14 |
| 6,212,554 B1 * | 4/2001 | Roskowski ................. | 709/217 |
| 6,248,946 B1 | 6/2001 | Dwek .......................... | 84/609 |
| 6,268,856 B1 * | 7/2001 | Bruck et al. ................. | 345/733 |
| 6,285,985 B1 * | 9/2001 | Horstmann ................... | 705/14 |
| 6,285,987 B1 * | 9/2001 | Roth et al. .................... | 705/27 |
| 6,295,061 B1 * | 9/2001 | Park et al. .................... | 345/764 |
| 6,314,451 B1 * | 11/2001 | Landsman et al. .......... | 709/203 |
| 6,317,761 B1 * | 11/2001 | Landsman et al. .......... | 715/513 |
| 6,389,458 B2 * | 5/2002 | Shuster ....................... | 709/213 |
| 6,401,075 B1 | 6/2002 | Mason et al. ................. | 705/14 |
| 6,466,967 B2 * | 10/2002 | Landsman et al. .......... | 709/203 |
| 6,516,311 B1 * | 2/2003 | Yacoby et al. ................. | 707/3 |
| 6,633,850 B1 * | 10/2003 | Gabbard et al. .............. | 705/14 |
| 6,763,379 B1 * | 7/2004 | Shuster ....................... | 709/224 |
| 6,785,659 B1 * | 8/2004 | Landsman et al. ........... | 705/14 |
| 6,876,974 B1 * | 4/2005 | Marsh et al. ................. | 705/14 |
| 6,904,453 B2 * | 6/2005 | Shuster ....................... | 709/203 |
| 6,907,566 B1 * | 6/2005 | McElfresh et al. ......... | 715/517 |
| 2001/0001863 A1 * | 5/2001 | Shuster ....................... | 709/203 |
| 2001/0047297 A1 * | 11/2001 | Wen ............................ | 705/14 |
| 2001/0054001 A1 * | 12/2001 | Robinson ..................... | 705/14 |
| 2002/0023094 A1 | 2/2002 | Kohda et al. ............. | 707/104.1 |
| 2002/0072972 A1 * | 6/2002 | Lamont ....................... | 705/14 |
| 2002/0120666 A1 * | 8/2002 | Landsman et al. .......... | 709/200 |
| 2002/0169829 A1 * | 11/2002 | Shuster ....................... | 709/203 |
| 2002/0198778 A1 * | 12/2002 | Landsman et al. ............ | 705/14 |
| 2003/0004804 A1 * | 1/2003 | Landsman et al. ............ | 705/14 |
| 2003/0028565 A1 * | 2/2003 | Landsman et al. .......... | 707/513 |
| 2003/0048293 A1 * | 3/2003 | Werkhoven .................. | 345/738 |
| 2005/0021612 A1 * | 1/2005 | Shuster ....................... | 709/203 |
| 2005/0096983 A1 * | 5/2005 | Werkhoven .................. | 705/14 |
| 2005/0203996 A1 * | 9/2005 | Shuster ....................... | 709/203 |

FOREIGN PATENT DOCUMENTS

| | | |
|---|---|---|
| JP | 9114781 | 5/1997 |
| JP | 2000148802 A | 5/2000 |
| KR | 2000054099 A | 9/2000 |
| WO | WO 9630864 | 10/1996 |
| WO | WO 97/07656 A2 * | 3/1997 |
| WO | WO 97/40447 A1 * | 4/1997 |
| WO | WO 97/40447 | 10/1997 |
| WO | WO 97/40514 | 10/1997 |
| WO | WO 97/40601 | 10/1997 |
| WO | WO-98/58334 A1 * | 12/1998 |
| WO | WO 99/59097 A1 * | 11/1999 |
| WO | WO 02/25507 A1 * | 9/2001 |
| WO | WO 02/061610 | 8/2002 |
| WO | WO 03/050744 | 6/2003 |
| WO | WO 2004/107224 A1 * | 12/2004 |

OTHER PUBLICATIONS

Porkaew, K. "How to Raise a Window on Top?", discussion thread from the newsgroup comp.lang.javascript, Oct. 10, 1996.*

McNeirney, J. "Change Window Focus", discussion thread from the newsgroup comp.lang.javascript, Apr. 3, 1997.*

Porn Rodeo, source code of thu <www.pornrodeo.com> website as of Oct. 13, 1999.*

Porn Rodeo, source code of the <www.pornrodeo.com> website as of Nov. 15, 1999.*

Matskin, M. "Collaborative Advertising over Internet with Agents", Proceedings of the 12th International Workshop on Database and Expert Systems, pp. 509-513, Sep. 3-7, 2001.*

Thompson, M. "Creating a Pop-Under Window", downloaded from <www.codeproject.com>, Dec. 27, 2001.*

Flanagan, D. "JavaScript: The Definitive Guide", Sebastopol: O'Reilly, pp. 199-224, 653-681, Fourth Edition, 2002. QA76.73.J39 F53 2002. ISBN 0-596-00048-0.*

Ranganathan, A. and R.H. Campbell, "Advertising in a Pervasive Computing Environment", Proceedings of the 2nd Internationa Conference on Mobile Computing and Networking, pp. 10-14, Sep. 2002.*

Crawley, M. "Popups and Popunders", downloaded from <www.onlinesoldier.com> on Jan. 27, 2003.*

Porn Rodeo, source code of the <www.pornrodeo.com> website as of Oct. 13, 1999.*

Brunner, R.E. "Tools of the Trade: Unicast: Good Things Come to Those Who Wait", Executive Summary, downloaded from www.unicast.com, Jun. 9, 1998.*

Kaplan, D. "Unicast Set to Launch Next Wave of Internet Advertising Multi-Platform 'Transitionals' May Represent an Alternativ to Banners", Channel7—TurboAds.com, Jul. 27, 1998.*
Unicast Communications "AdController: Introduction", downloaded from www.unicast.com, Jan. 29, 1999.*
ExitExchange "Quick Tour", downloaded from www.exitexchange.com, Apr. 7, 2000.*
ExitExchange "General Questions", downloaded from www.exitexchange.com, Apr. 8, 2000.*
Moylan, M.J. "New Pop-Under Web Advertising Earns Attention", Saint Paul Pioneer Press, Jun. 1, 2001.*
RadioHorizon "Byproduct of Collapsing Online Ad Market: Now You Can Buy the Entire Internet", downloaded from www.radiohorizon.com, Jun. 8, 2001.*
Olsen, S. "Online Ads Get in Your Face", CNET News.com, Jun. 13, 2001.*
Bartlett, M. "Pop-Under Web Advertising Increasingly Popular, Draws Ire", Newsbytes, Jun. 19, 2001.*
Tessler, J. "Marketers Grab Attention by Putting Web Ads into Motion", San Jose Mercury News, Jun. 25, 2001.*
Featherly, K. "How Annoying Can Online Ads Get?", Newsbytes, Jul. 6, 2001.*
Swett, C. "Internet Advertisers Turn to Pop-Under Windows to Generate Sales", Sacramento Bee, Aug. 2, 2001.*
Neuborne, E. "Irksome—and Effective: Desktop 'Pop-Unders' Allow for More Ads, and Healthy Response Rates", Business Week, p. EB6, Sep. 3, 2001.*
Advertisement Banners "About Us", downloaded from www.advertisementbanners.com, Jun. 4, 2003.*
Luna, C. "Internet Upstarts Savor Court Victory over Security Camera Ads", Los Angeles Times, Oct. 20, 2003.*
The Associated Press "Brothers Win 'Web Bully' Lawsuit", CBS News.com, Oct. 20, 2003.*
Chuang, T. and R. Srisavasdi "Bankrupcy of Wireless Camera Firm May Hurt California Brothers' Suit", The Orange County Register, Oct. 24, 2003.*
SpecificPOP "About SpecificPOP", downloaded from www.specificPOP.com, 2003.*
Festa, P. "GeoCitizens Bristle at Pop-Up Ads", CNET News, Dec. 18, 1997.*
Kornblum, J. "N.Y. Times Tries Pop-Up Ads"), CNET News, Jan. 16, 1988.*
Creative Edge Internet Services "Welcome to Creative Edge Internet Services", downloaded from www.netbreak.com.au, Mar. 9, 2000.*
McCloskey, B. "Rich Media Down Under", Clickz Experts article, downloaded from www.clickz.com, Mar. 23, 2000.*
Weintraub, J. "Trends Report—Internet Arbitrage: A Short History", downloaded from www.dmconfidential.com/blogs/category/Marketing/462, Oct. 6, 2006.*
Specific Media, Inc. "About Us > Our Team > Tim Vanderhook", downloaded from www.specificpop.com/bio_tim_vanderhook.php, Apr. 26, 2007.*
Foreshew, J. "Nifty Ads Popping Up on Big Pond", Australasian Business Intelligence (Australian), Jan. 26, 1999, p. 44.*
Foreshew, J. "ISP's Anzwers Seeking Questions", Australasian Business Intelligence (australian), Apr. 6, 1999, p. 41.*
Herceg, R. "Internet Futures: The Death of the Banner Ad", Australasian Business Intelligence (Ad News), May 7, 1999, p. 20.*
Needham, K. "Ads Now in Top10: Whether You Like It or Not", Australasian Business Intelligence (Sydney Morning Herald), Apr. 27, 2000, p. 29.*
"Netbreak Beats Banners", Australasian Business Intelligence (Ad News), Sep. 8, 2000, p. 19.*
Rumble, C. "Netbreak Offers Pop-Up E-Mail", Australasian Business Intelligence (B&T), Nov. 17, 2000, p. 11.*
"PATNEWS:Popunder ad patent app busting;Konrad patents still busted." PATNEWS newsletter forwarded on Wednesday, Jul. 17, 2002. 5 pages.
Porn Rodeo Code taken from the Wayback Machine's archived version of Porn Rodeo's Oct. 13, 1999 website. Downloaded Aug. 2002. 1 page.

Four screen shots of the Porn Rodeo Website and pop-up and/or pop under activity. At the time the screen shots were taken (Aug. 23, 2002) it was not possible to get the pop under feature to work properly and applicants do not admit that these screen shots show the claimed invention. Prepared Aug. 23, 2002. 4 pages.
"PopUp Killer," ULTIWARE, Downloaded of www.ultiware.com.popup.htm, 1999-2000.
Kendall Dawson, "Who Started Popup Advertising and Why?", Downloaded of www.4degreez.com/popupsmustdie/history.htm, 1999.
"KillAd—Kill Advertising Popup-Windows Easily," FCS, Downloaded of wwwwin.wplus.net/pp/fsc, 1998-1999.
Millward Brown Interactive, "Evaluating the Effectiveness of the SUPERSTITIAL," Unicast SUPERSTITIAL Rich Media Effectiveness Study, Report of Findings, at least as early as Oct. 1999, 16 pages.
Web page printout, Press Release Leading Online Ad Networks and Ad Management Solutions Flycast, Doubleclick, Adsmart, and Netgravity to Offer Unicast's Superstitial Rich Media Advertising Format to Advertisers and Sites, at least as early as Oct. 18, 1999.
Jennifer Rewick, "Choices, Choices," "A Look at the Pros and Cons of Various Types of Web Advertising," Apr. 23, 2001, The Wall Street Journal, 7 pages.
Richard Hopple, White Paper, "Creative Flexibility in the Digital World", www.unicast.com/pressroom/whitepapers/flexibility.html, at least as early as May 21, 2001.
Web page printout, "How It Works," www.unicast.com/superstitial/howitworks.html, at least as early as May 22, 2001.
Porkaew, K. "How to Raise a Window on Top?", discussion thread from the newsgroup comp.lang.javascript, Oct. 10, 1996.
McNeirney, J. "Chane Window Focus"., discussion thread from the newsgroup comp.lang.javascript, Apr. 3, 1997.
Porn Rodeo, source code of the <www.pornrodeo.com> websiteas of Oct. 13, 1999.
Hopple, Richard, White Paper, "Creative Flexibility in the Digital World", www.unicast.com/presroom/whitepapers/flexibility.html, at least as early as May 21, 2001.
Porn Rodeo, source code of the <www.pornrodeo.com> websites of Nov. 15, 1999.
Rewick, Jennifer, "Choices, Choices: A Look at the Pros and Cons of Various Types of Web Advertising," Apr. 23, 2001, The Wall Street Journal, 7 pages.
Matskin, M., "Collaborative Advertising over Internet with Agents," Proceedings of the 12th International Workshop on Database and Expert Systems, pp. 509-513, Sep. 3-7, 2001.
Thompson, M., "Creating a Pop-Under Window", downloaded from <www.coderproject.com>, Dec. 27, 2001.
Flanagan, D., "JavaScript: The Definitive Guide", Sebastopol:O'REilly, pp. 199-224, 635-681, Fourth Edition, 2002. QA76.73.J39 F53 2002. ISBN 0-596-00048-0.
"PATNEWS: Popunder ad patent app busting; Konrad patents still busted," PATNEWS newsletter forwarded on Wednesday, Jul. 17, 2002, 5 pages.
Porn Rodeo Code taken from the Wayback Machine's archived version of Port Rodeo's Oct. 13, 1999 website. Downloaded Aug. 2002. 1 page.
Ranganathan, A. and Campbell, R.H., "Advertising in a Perspective Computing Environment", Proceedings of the 2nd International Conference on Mobile Computing and Networking, pp. 10-14, Sep. 2002.
Crawley, M., "Popups and Popunders", downloaded from <www.onlinesoldier.com> on Jan. 27, 2003.
http://www.harmonyridgemusic.com/falk/Mid/, "Overview of Spam From Middleton", Aug. 9, 2006, pp. 1-9.
Baker, "Hypertest Browsing in the Internet," UNIX Review, vol. 12, No. 9, Sep. 1994, pp. 21-26.
Devoney, Using PCDOS, 1986, p. 340.
Spry, Airmos. Hip Windows Help File, Ap. 3, 1995, Browsing with Mosaic, The SPRY Mosaic Console.
Michalski, Content in Context, RELease, 1.0, vol. 94, No. 9, Sep. 27, 1994, pp. 1-13.
McArthur, World Wide Web & HTML, Dr. Dobb's Journal, Dec. 1994.

Davison, Coding with HTML Forms, Dr. Dobb's Journal, Jun. 1995, pp. 70-75, 106-109.

Grobe, Michael, "HTML quick Reference," Oct. 11, 1995, Academic Computing Services, University of Kansas.

Sreenivasan, S., "The World Wide Wait: Don't Get Made Get fOff," The New York Times, Sep. 30, 1996, p. C5.

Kevin Kelly and Gary Worf, et al, Pushl Kiss your Browser goodbye: The radical future of media beyond the Web, Wired Magazine, Mar. 1997, pp. 12-23.

Cathy Taylor, "Going Beyond the Banner", Jul. 8, 1996, pp. 36-41 (Brand week 1996).

Jane Hodges, "Marketers play Web games as serious biz", Mar. 11, 1996, (Advertising Age).

Isao, Patent Abstracts of Japan, vol. 95, No. 2, Mar. 31, 1995 & 06314184 A.

Oliver, Netscape 2 Unleashed, Sams.net Publishing, Feb. 1996, p. 36, 37, 40, 41, 205-210, 498-499, 576 and 577.

Gunn, Power in Pictures, Computer Shopper, Nov. 1994, v. 14, n.11, p. 599-600.

Ayre, Rick and Don Willmott, "See the Sites Beyond Browsing", Oct. 10, 1995, PC Magazine, pp. 151-201.

Pike, et al., Using Mosaic, 1994, p. 82-85, 223.

Newsbytes, Ziff Davis to Offer Advertising on Web Pages, pNEW03300020, Mar. 30, 1995.

Reaching Shoppers Beyond Retail, Computer Retail Week, v.5, N.99, p. 76(3), May 8, 1995.

Coleman, An Investigation into Integrating Hypertest and Messengers, Information Engineering, pp. 181-184, Jul. 3, 1995.

Abernathy, Create a Custom Newspaper, PC World, vol. 13, No. 8, p. 68, Aug. 1995.

"Broadcasting an Array of Data: Turn your passive Website into a proactive service," 2D Internet Magazine, Dec. 1996, vol. 1, Issue 1, p. 37.

Ranganathan, A. and Campbell, R.H., "Advertising in a Pervasive Computing Environment," Proceedings of the $2^{nd}$ International Confernece on Mobile computing and Networking, pp. 10-14, Sep. 2002.

Crawley, M., "Popups and Popunders," downloaded from www.onlinesoldier.com on Jan. 27, 2003.

Post-Session Internet Advertising System, Andrew Vilcauskas, et al., Inventors, USPTO Image File Wrapper for U.S. Appl. No. 09/866,425, filed May 24, 2001, 798 pages.

Post-Session Internet Advertising System, Andrew Vilcauskas, et al., Inventors, USPTO Image File Wrapper for U.S. Appl. No. 10/784,663, filed Feb. 23, 2004, 291 pages.

Post-Session Internet Advertising System, Andrew Vilcauskas, et al., Inventors, USPTO Image File Wrapper for U.S. Appl. No. 10/784,358, filed Feb. 23, 2004, 147 pages.

* cited by examiner

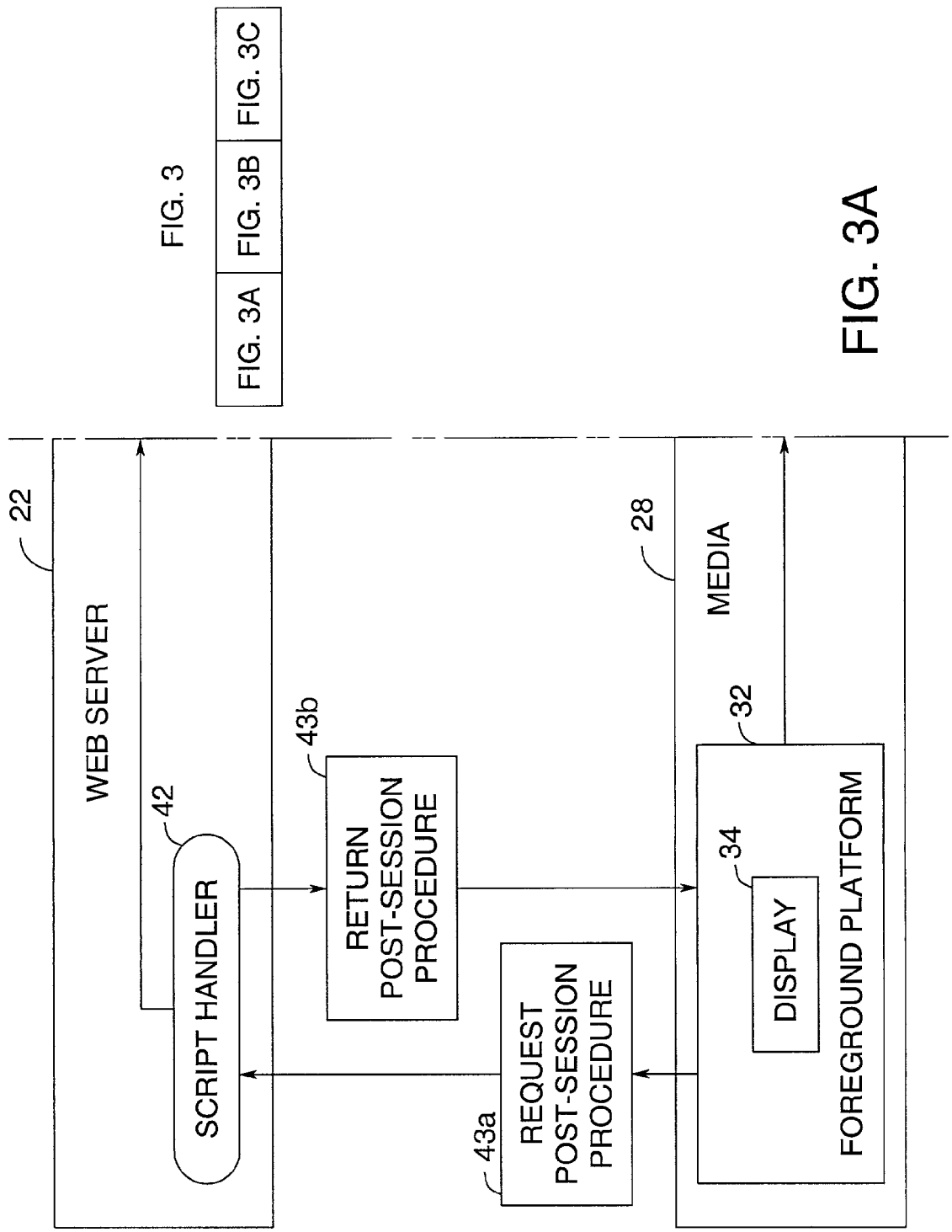

POST-SESSION INTERNET ADVERTISING SYSTEM

The present application is based on and claims priority from provisional application Ser. No. 60/207,698, filed May 26, 2000.

BACKGROUND OF THE INVENTION

The post-session Internet advertising system of the present invention is a system and method for delivering displays to viewers browsing displays with platforms, for exchanging traffic between platforms, and for accurately tracking focus time on display content.

Web pages can be created using Hypertext Mark-up Language ("HTML") and Extensible Mark-up Language ("XML"). HTML is a text-based set of instructions (known as "tags") that describe the layout of elements on a Web page. HTML can also be used to create "links" (generally, a highlighted word, phrase or graphic image that points to a target such as another Web page) on the World Wide Web. XML consists of a set of tags that abstractly describe data, which can be translated into HTML using standard tools. In addition, a Web page can be divided into subpages (using Frames, an HTML extension). A frameset is the set of subpages that together comprise a Web page. (For example, a Web page may be divided horizontally creating a frameset of two subpages comprising the top and bottom half of the Web page). In addition to its use in creating Web pages, HTML and XML can be used to create advertising for the Internet. The developer or maintainer of a Web site can insert HTML or XML code in their Web pages so that when potential customers view the Web page an advertisement and a link to another Web site is displayed.

Web pages and Internet advertising may be enhanced by small programs written in the Java language that are built into a Web page to perform a specific function (such as displaying an animation), often referred to as "applets." In addition, scripting languages such as JavaScript or VBScript are used to enhance the capabilities of Web pages by performing functions that are beyond the scope of HTML and XML, such as popping up special windows in response to mouse clicks. Scripting languages include an event driven model responsive to changes in a client's state and an Application Programmer's Interface for defining custom behaviors to be followed in response to such "events."

Another technique often used by Web site developers and Internet advertisers is to place a text file on the hard disc of a client when the user visits a Web site. These text files, referred to as "cookies," are retrieved and read on subsequent visits that a user makes to the Web site. Cookies can be used to track the behavior of site visitors.

The economic potential of the Internet is enormous, but the medium is still in its early stages of development. Revenue is directly proportional to the volume of qualified potential customers ("traffic") that reach and view a commercial Web site. Each visit (often referred to as a "hit") to a commercial Web site has economic value. Thus, the primary goal of Internet marketing is generating traffic. A secondary goal is to get potential customers to make purchases or otherwise use a commercial Web site (i.e., "capture traffic"). Traffic is more difficult to generate than it is to capture. Further, investment made to generate traffic produces a greater economic return than investment made to capture traffic. A company can a spend a lot of money on effective Web site design so that potential customers will have a rewarding experience and thus a higher inclination to make a purchase once the customer has reached the Web site. But investment in Web site design is wasted unless the site is actually visited. A third goal is "branding," or increasing consumer awareness or recognition of a brand.

In order to meet these goals, most Internet businesses use interrupting advertisements such as pop-up windows, or space consuming advertisements (or "real estate" consuming advertisements) such as banner advertisements, link exchanges, and banner exchanges. Other Internet businesses use alternative advertising methods such as bulk e-mail. Although interrupting advertisements guarantee that a user will see the advertisement for at least a split second, if only to locate the icon used to close the window, these interrupting advertisements are particularly offensive to potential customers because they force the user's attention to be diverted. Most users simply close the window of an interrupting advertisement. Space consuming advertisements, on the other hand, are so pervasive that they have become "white noise." Usually, a viewer focuses his attention on the information he needs from the Web page and ignores the space consuming advertisement. Alternative advertising methods are similarly problematic.

With pop-up window advertising, a separate window of a Web browser is displayed "on top" or "in front" of the Web page being viewed. The advertisement, which may be larger, smaller, or the same size as a banner advertisement, is displayed in the new browser window. Pop-up window advertising has the advantage (for the Web site designer) of displaying an advertisement without having to change the layout of the Web page displaying the advertisement. But potential customers commonly consider the pop-up aspect disruptive and annoying.

Banner advertising, a space consuming advertising method, is currently the primary method of advertising on the World Wide Web. Banner advertising relies on HTML and some of the techniques used to create a Web site. Site maintainers insert HTML code in their Web pages that causes a small advertisement (approximately 0.5"×2" on the average screen) to appear in a frame on the Web page, i.e., a "banner advertisement." The HTML code also contains a link to another site. In short, when potential customers view a Web site with banner creating HTML code, a banner advertisement and link are displayed on the Web page. The more traffic a Web sites has, the more it can charge for displaying banner advertisements. The reason is that a banner advertisement placed on a high volume site generates a lot of traffic for the advertised Web site. In theory, this is advantageous for both parties. But market research shows that as use of the Internet becomes widespread, banner advertisements are becoming less effective. The average potential customer is becoming jaded because banner advertisements appear on almost every Web site. A measure of the effectiveness of Internet marketing is the CTR, or click-through ratio. CTR is the ratio of the number of times an advertisement is exposed to the number of hits generated by the advertisement when viewers "click through" to the advertised site. The trend is that CTRs for banner advertisements are dropping.

Link exchanges are another space consuming advertising method for generating Web traffic. A link exchange is an arrangement whereby a first Web site puts a link on its site to a second Web site. In exchange, the second Web site places a link on its site to the first Web site. In addition to exchanging links, a fee may be paid by one site to the other. Each link to the other site is generally placed in a prominent place on the referring Web site. Effectively, a link exchange is a mechanism for sharing traffic between two Web sites.

Alternatively, links may not be exchanged. Instead, a first Web site pays a second Web site to put a link to it on the second Web site. Link exchange advertising has the advantage of lower cost than other advertising methods. In fact, a link exchange may be free. In addition, any consideration paid for a link exchange or link placement is generally much lower than that for banner advertisements. A drawback of link exchanges is that their effectiveness varies. The effectiveness depends on where the link is placed, whether there is an image associated with it (thus blurring the line between a link exchange and a banner advertisement), and how much traffic each site receives from other forms of marketing. Market research shows that CTRs on link exchanges are consistently lower than CTRs for banner advertising.

Banner exchanges are a hybrid of banner advertising and link exchanges. A Web site joins a Web site syndicate and adds special banner advertisement HTML code to its Web site. The special HTML code causes a banner advertisement for and a link to a syndicate member Web site to be displayed. Typically, the banner advertisement varies so that an advertisement for each syndicate member is alternately displayed. A syndicate may be joined for free or for a nominal fee. In exchange for displaying banner advertisements, banner advertisements for the member's Web site are displayed on the Web sites of other members. In addition, the company managing the exchange syndicate will usually have paid advertisers as members. Fees paid by such advertisers represent a source of revenue for the company managing the exchange syndicate. A limitation of banner exchanges is that they are still fundamentally banner advertisements and as such are experiencing the same declining CTRs as conventional banner advertisements.

Bulk e-mail is an alternative advertising method that has a reasonable return on investment but potential customers generally regard it unfavorably. If the bulk e-mail message is read, it may effectively generate traffic. But it is far more likely that the potential customer immediately identifies the message as a "UBE" (unsolicited bulk e-mail), sends complaints to the sender and to their connection provider, and deletes the message unopened and unread.

Two events that are important to understanding the experience of a viewer browsing the Web are the "focus" and "blur" events. Typically, a viewer accesses the Internet using a platform, such as a Web browser, on media, such as a computer. For example, a viewer accessing the Internet using the Internet Explorerm Web browser as a platform on media consisting of a computer running the WindowsTM operating system observes the platform as appearing in a window. Focus and blur describe states of a window. A focus event occurs if a window is selected so that it may currently receive input from a viewer. A blur event occurs if focus is removed from a window. While it is possible to simultaneously have multiple windows open, only one window may have focus at any time. If a window is in the focus state, it always fully visible (i.e., it appears "on top" of other open windows) and is sometimes referred to as the "active" window. Windows that are in the blur state are said to be in the "background" and are at least partially obscured by the window in the focus state. A viewer "clicks on" or otherwise selects a window to create a focus event. Alternatively, a computer program may cause a focus event. A focus event may also be referred to as a "view triggering event."

With known Web marketing techniques there is no way of knowing if an advertisement has been seen by the potential customer. A banner advertisement, pop up window, or other Internet advertisement may appear at length in an active window and be fully visible, or may appear only momentarily in an active window and be at least partially obscured for most of the period it is displayed. The time an advertisement is displayed in an active window is called "focus time." Known techniques do not verify the focus time of an advertisement that has been delivered to a potential customer.

BRIEF SUMMARY OF THE INVENTION

The post-session Internet advertising system of the present invention is a system and method for delivering displays to viewers browsing displays with platforms, for exchanging traffic between platforms, and for accurately tracking focus time on display content. This method of content delivery overcomes many of the inherent limitations of known Internet based advertising methods.

The present invention is directed to a post-session advertising system that may be used in media such as computers, personal digital assistants, telephones, televisions, radios, and similar devices. In one preferred embodiment, a first display is viewed in a first platform in the foreground of a media by a viewer. Then, a load triggering event is initiated by the viewer. Next, in response to the load triggering event, a post-session platform is opened to display a post-session display in the background of the media. Significantly, in the preferred embodiment, the post-session platform stays in the background until a view triggering event occurs. The type of platform and display used will depend significantly on the media.

In one preferred embodiment of the present invention an optional focus timer is activated by the view triggering event to allow an accurate assessment of the actual time a viewer focuses on the display in the post-session platform.

In another alternate preferred embodiment of the present invention, the number of post-session platforms is limited to, for example, one platform. Multiple load triggering events would either be ignored or would cause the display to refresh (or change) in the already loaded post-session platform.

The computer and the Internet are exemplary media that might be used in the present invention. In this exemplary embodiment, Web browsers are the platforms. Further, in this exemplary embodiment, Web sites and advertisements are exemplary display content. More specifically, while a participating Web site (display content) is being visited by a viewer using a first Web browser (platform), a second or post-session Web browser (platform) loads with a second or post-session advertisement (display content) upon a first or load triggering event such as exiting the specific Web page. The post-session Web browser does not disrupt the viewer's browsing experience in his first Web browser. Instead, a second or view triggering event, such as closing the first Web browser, allows the post-session Web browser (and the advertisement thereon) to be viewable by the viewer. The present invention may also monitor the period of time that the advertisement appears in the now active post-session Web browser and provides statistical information to advertisers.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWING

FIGS. 3A, 3B, and 3C are block diagrams of an exemplary embodiment of a Web server, a client, media, and a count daemon of the present invention showing a load triggering event, a view triggering event, and data flow of the post-session Internet advertising system of the present invention.

DETAILED DESCRIPTION OF THE INVENTION

Figure 1:
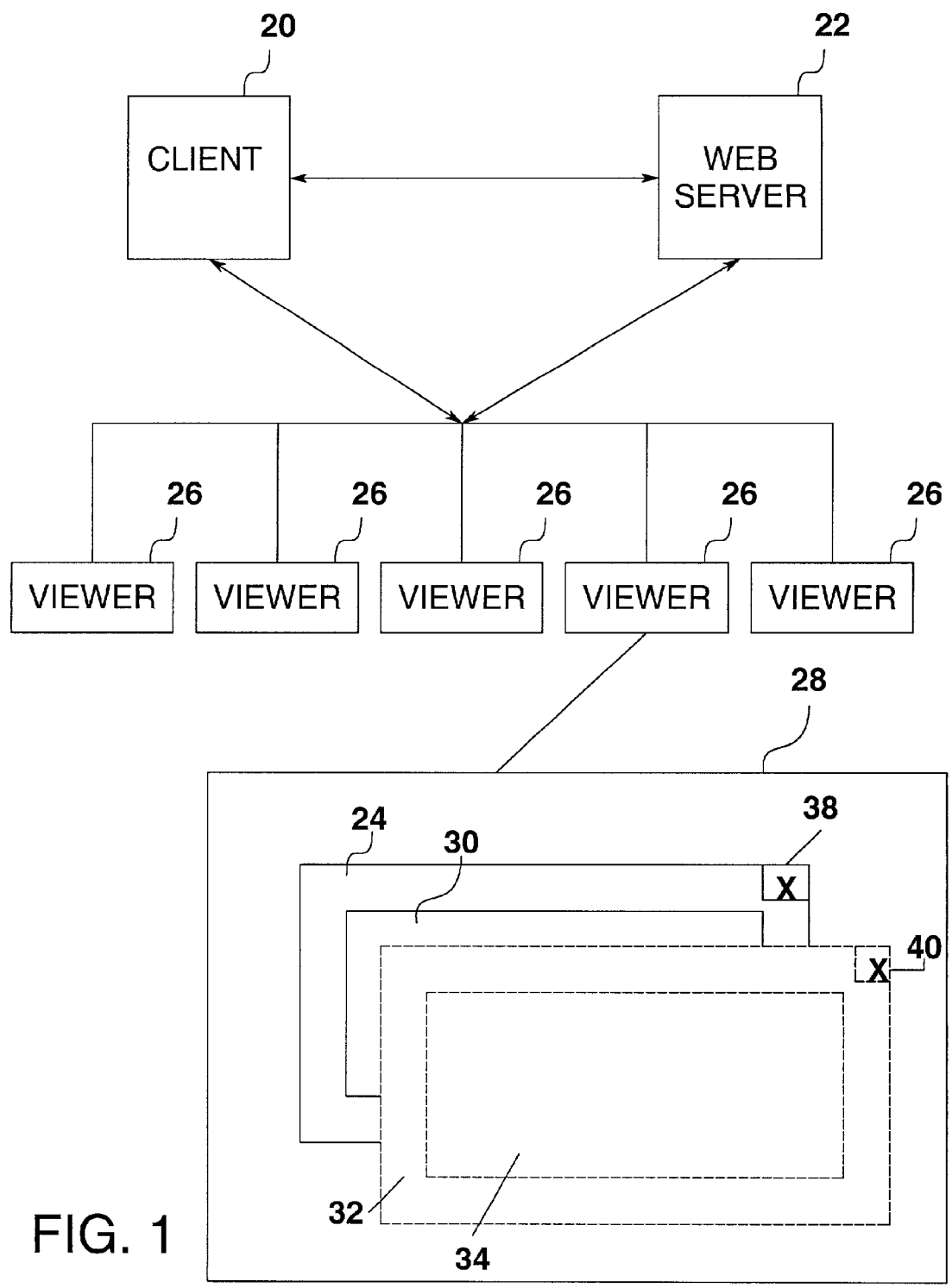
FIG. 1 is a block diagram of an exemplary embodiment of a client, a Web server, media, and at least one viewer, platforms and displays of the post-session Internet advertising system of the present invention.
Figure 2:
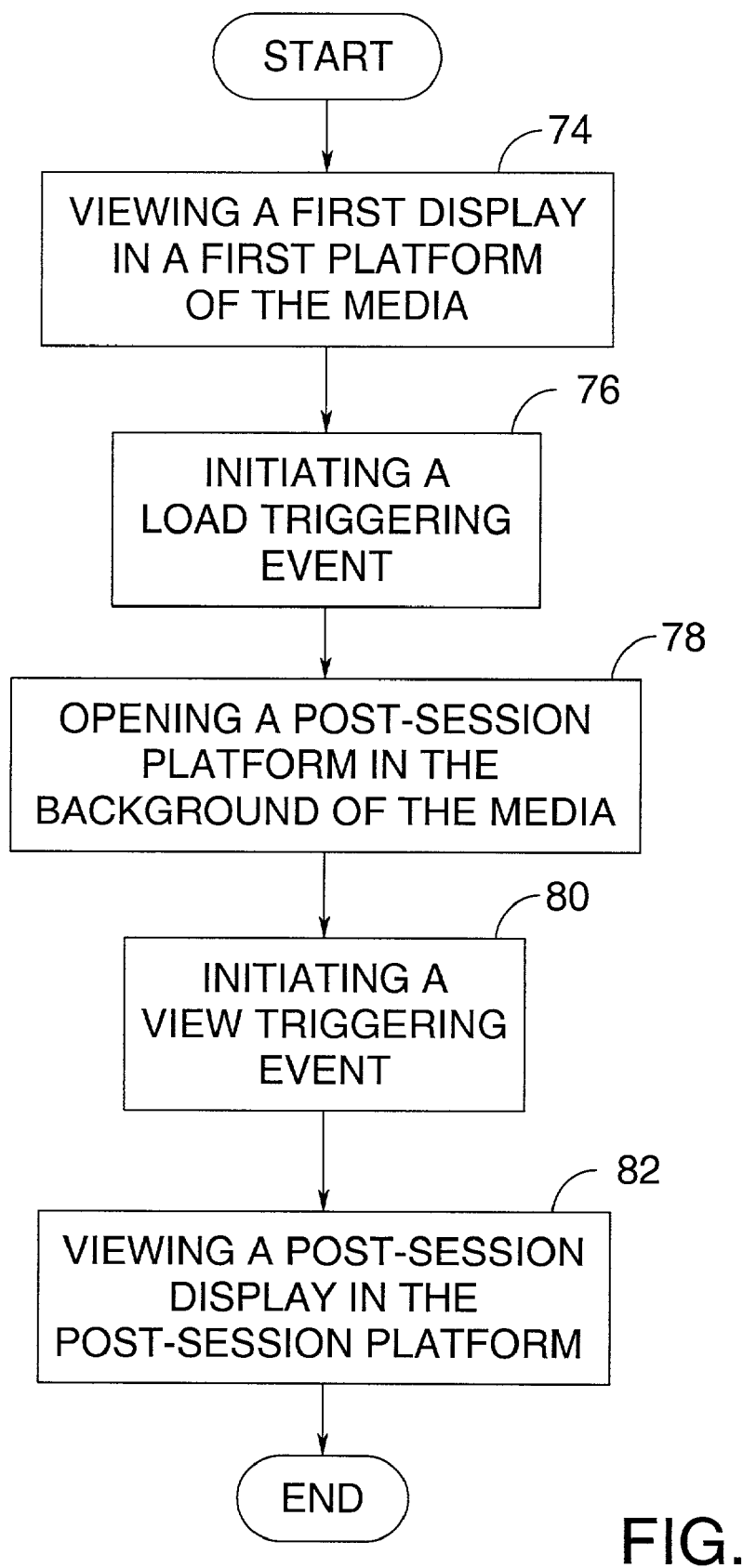
FIG. 2 is a flow diagram showing the sequence of steps that a viewer observes or initiates in the process of delivering a display in an exemplary embodiment of the post-session Internet advertising system of the present invention.

The post-session Internet advertising system of the present invention is a system and method for delivering displays to viewers browsing displays with platforms, for exchanging traffic between platforms, and for accurately tracking focus time on display content. As shown in FIGS. 1 and 2, a client 20 interacts with a Web server 22 to deliver, upon the occurrence of a "load triggering event," a post-session platform 24 to a viewer's 26 media 28 so that the viewer 26 may view the client's 20 post-session display 30 after the viewer 26 has exited (or another "view triggering event" has occurred) a foreground platform 32. Specifically, when the viewer 26 who is viewing a first or foreground display 34 in a first or foreground platform 74 exits a client's foreground platform 32 (or another load triggering event occurs 76), a post-session platform 24 is opened and is immediately sent to the background 78. Because it is in the background, the post-session platform 24 does not disrupt the viewer's 26 browsing experience. When the viewer 26 closes the foreground platform 32 (either the original or a subsequent platform 32) or another view triggering event occurs 80, the post-session platform 24 comes to the foreground 82. Finally, in one preferred embodiment, the amount of time the post-session platform 24 spends in the foreground may be monitored.

Throughout this specification terminology will be used to describe the present invention. The following definitions and examples of the terminology are not meant to exclude broader concepts, unspecified examples, or undeveloped technology that would logically fall within the scope of the invention. Viewers 26, for example, may be potential voters viewing a television program or potential customers browsing the Internet on a computer. The term "viewer" is also used to describe a telephone user, a radio listener, or any media user. Clients 20 are entities that want to advertise or direct traffic such as commercial enterprises, political, governmental, non-profit, or charitable organizations, individuals, hobbyists, or any other person or entity that wants to advertise or direct traffic. The Web server 22, as will be described in detail below, substantially controls or directs the system of the present invention. Media 28 may be any communication device, including but not limited to computers, personal digital assistants, telephones, televisions, radios, and similar devices. Platforms 24, 32 are means through which a viewer accesses a display to the exclusion of other displays. A platform may allow the viewer to play, show, enable, perform, transmit, update, or record the selected display. Platforms 24, 32 may include, for example, Web browsers, browser windows, media channels, media stations, media frequencies, audio connections, streaming media, content delivery applications, media viewing or interacting technology, and similar means. A foreground platform 32 is a platform that can be primarily sensed by a viewer 26. A post-session platform 24 is a platform that begins its life in the background and that can be fully sensed by a viewer 26 only after it has been brought to the foreground. Displays 30, 34 have content that a viewer 26 sees, hears, or otherwise senses within or from a platform 24, 32. Displays 30, 34 may include, for example, Internet content (such as streaming video, Web sites, Web pages), video broadcast content (such as television programs, movies, videos, commercials, and infomercials), audio broadcast content (such as radio programs, commercials, and sound recordings or such as commercials or sound recordings played over a telephone connection), and any other content capable of being transmitted over media.

As mentioned above, FIG. 2 is a flow diagram showing the sequence of events from the viewer's 26 perspective. The viewer 26 first views 74 a first or foreground display 34 in a first or foreground platform 32 of media 28. The viewer 26 then initiates 76 a load triggering event. This event causes the opening 78 of a second or post-session platform 24 in the background of the media 28. The post-session platform 24 remains in the background until the viewer 26 initiates 80 a view triggering event. The viewer 26 then views 82 the post-session display 30 in the post-session platform 24.

Figure 3B:
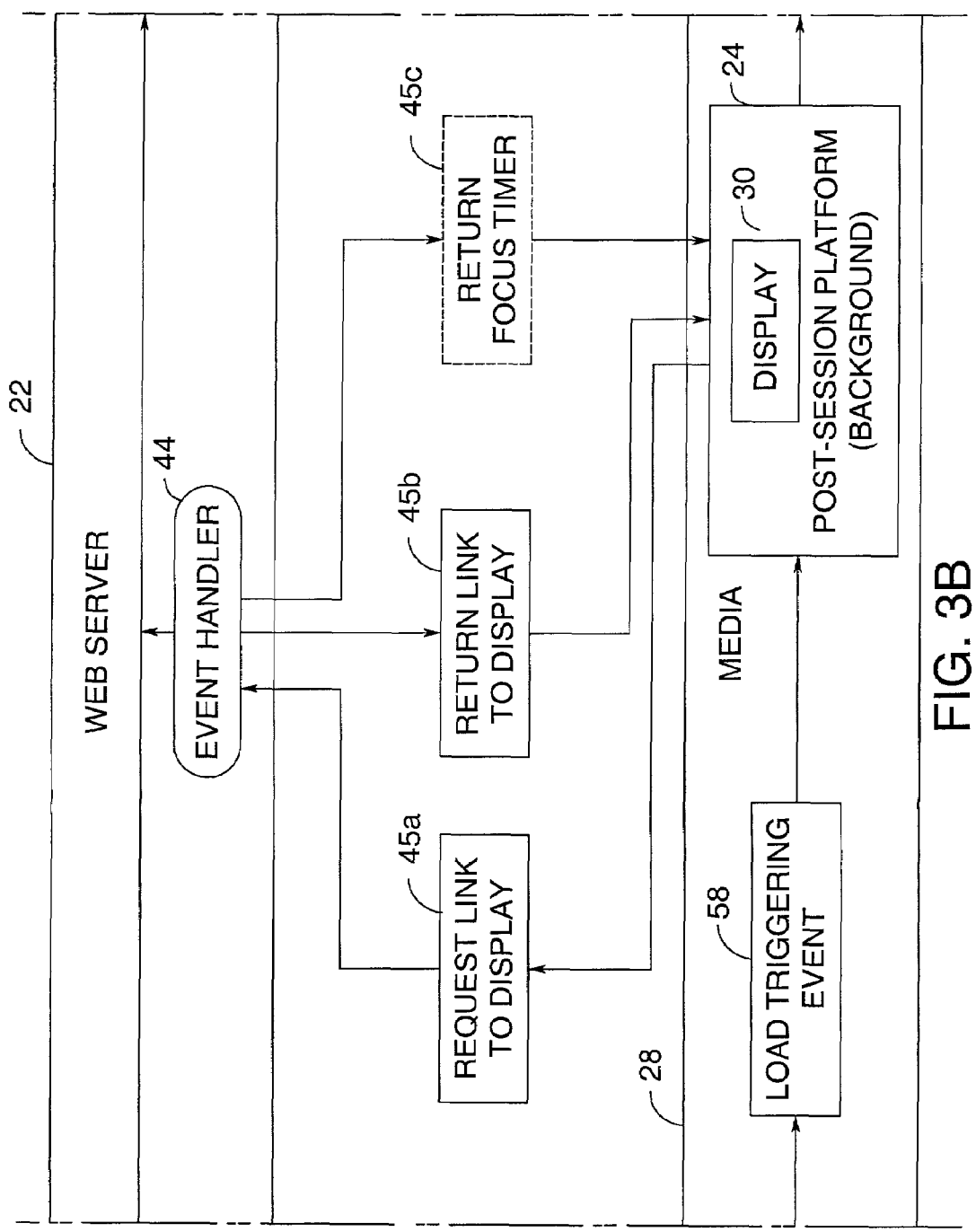
Figure 3C:
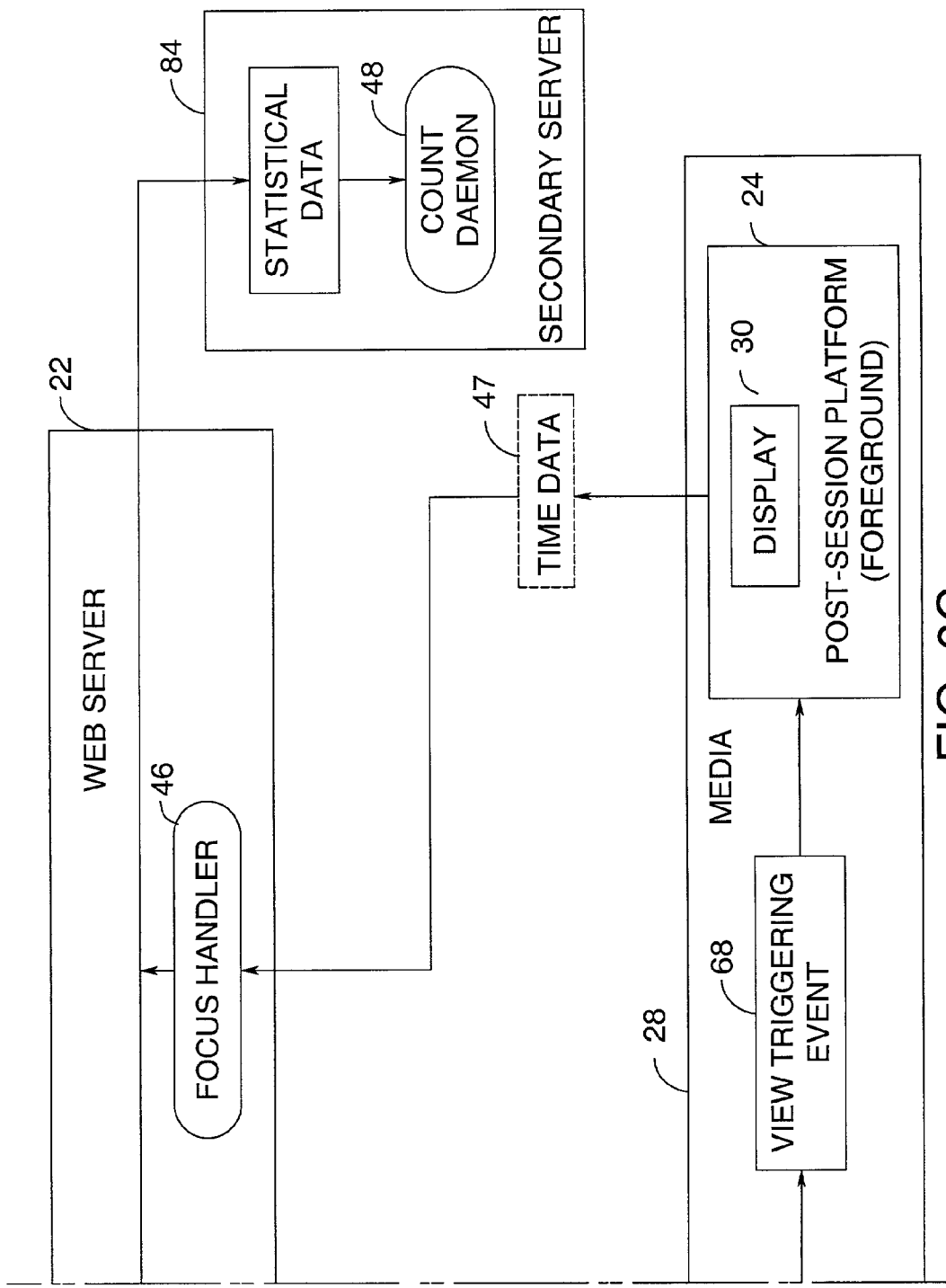

FIGS. 3A-3C show an exemplary system of the present invention with data flow between elements of the system. It should be noted that the functions shown in the Web server 22 element may be implemented by the Web server 22 alone (as shown), by a combination of the Web server 22 and the client 20, or by the client 20 alone. It should also be noted that the media 28 is shown as providing the foreground platform 32, the post-session platform 24 while it is in the background, and the post-session platform 24 while it is in the foreground. Exemplary individual elements of the system are detailed in separate figures. Specifically, FIG. 4 details an exemplary script handler 42, FIG. 5 details an exemplary event handler 44, FIG. 6 details an exemplary focus handler 46 and the timer applications, and FIG. 7 details an exemplary count daemon 48.

Figure 8:
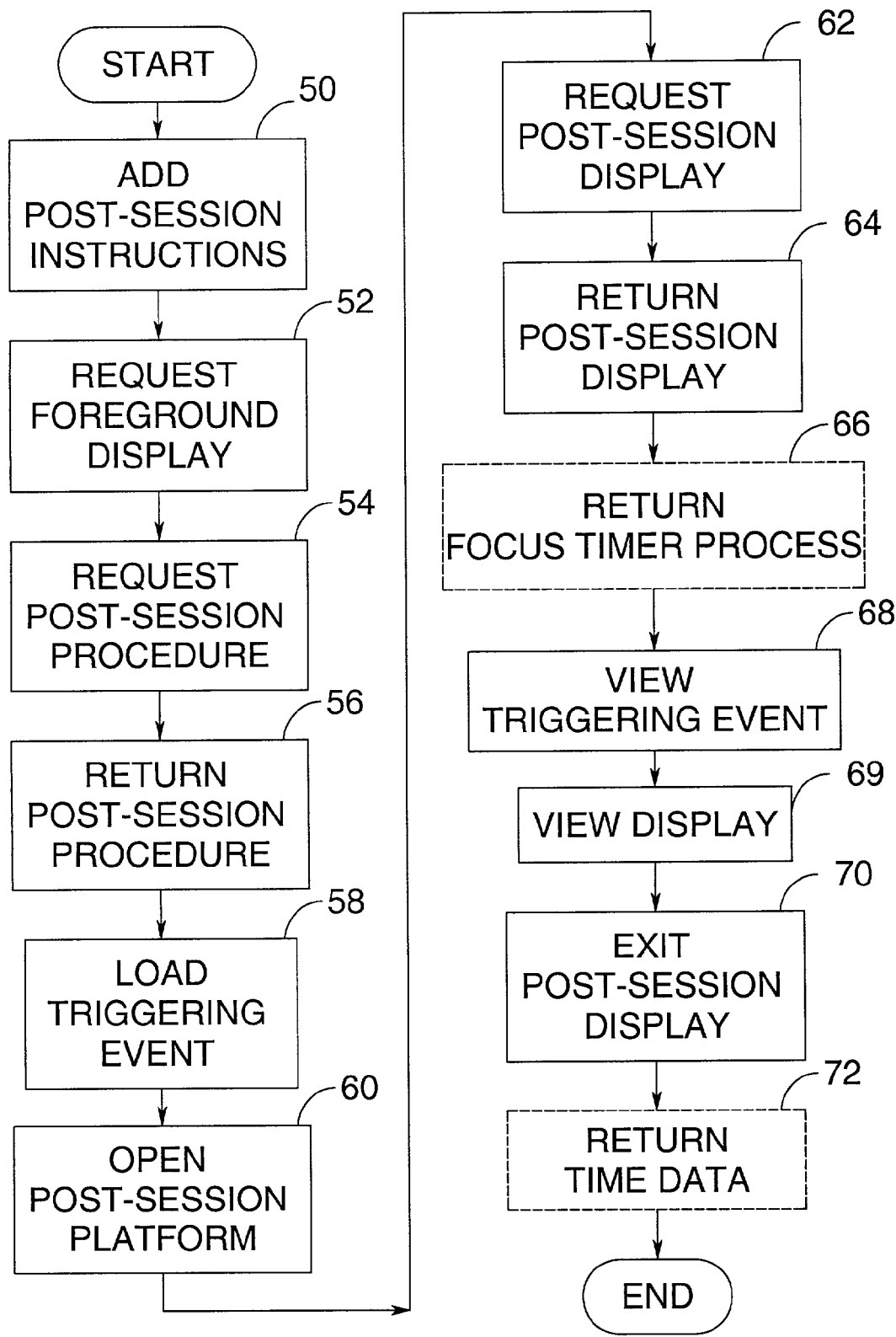
FIG. 8 is flow diagram of the process of the post-session Internet advertising system of the present invention.

FIG. 8 is a flow diagram showing the sequence of steps in the process of delivering display content in the embodiment of the present invention shown in FIGS. 3A-3C. In the first step, a client 20 adds post-session instructions to its display 50. A viewer 26 requests a foreground display 52 from a first or foreground platform with post-session instructions embedded (or otherwise linked) therein. After the foreground display 34 loads, the post-session instructions cause a post-session procedure 43a to be requested 54 and, in turn, the script handler 42 returns a post-session procedure 43b, 56. At some point the viewer 26 initiates a load triggering event 58. This load triggering event causes a post-session platform to open 60 in the background (physically behind or otherwise hidden from the viewer) and also causes the post-session platform to request a post-session display 62. In one alternative embodiment, the post-session platform 24 that opens is of a type different from the foreground platform 32. The event handler 44 receives the request for a link 45a, 62 and returns a link to post-session display 45b, 64. In an alternative preferred embodiment, the client 20 includes an event handler 44 that receives request 62 and returns a post-session display 64 into a secondary post-session platform. Optionally, the event handler 22 returns a focus timer process 45c, 66. The post-session platform 24 and display 30 remain in the background until the viewer 26 initiates a view triggering event 68. The viewer 26 views the post-session display in the post-session platform 69. After the viewer 26 is done viewing the post-session display 30, the viewer 26 exits the post-session display 70. Optionally, when the viewer 26 exits the post-session display, time data 47 may be returned to the focus handler 72. A count daemon 48 (which may be housed in the Web server or in a secondary server 84) optionally may monitor and/or analyze statistical data. It should be noted that the script handler 42, event handler 44, and focus handler 46 may be processes implemented by the Web server 22 as shown or may be processes implemented by a plurality of servers or may be multiplied or divided into any number of processes.

Applying the basic flow shown in FIGS. 3A-3C and 8 to an exemplary embodiment of a Web surfer viewer surfing the Internet, a commercial client 20 adds post-session instructions (HTML code) to its Web page display 50. A surfer 26 requests the client's Web page 52 with the post-session instructions (HTML code) embedded therein. After the foreground Web page 34 loads, the post-session instructions (HTML code) cause a script code 54 to be requested and, in turn, the Web server 22 returns a script code 56. At some point the surfer 26 initiates a load triggering event 58, usually by exiting the initially viewed client's Web page. This load triggering event causes a post-session browser to open 60 behind the foreground browser and also causes the post-session browser to request a post-session display 62. The Web server 22 receives request 62 and returns a link or address to a post-session display 64. Optionally, the Web server 22 also returns a focus timer 66. The post-session browser 24 and display 30 remain in the background until the surfer 26 initiates a view triggering event 68 such as exiting the foreground browser 32. The surfer 26 views the post-session display in the post-session browser 69. After the surfer 26 is done viewing the post-session display 30, the surfer 26 exits the post-session display 70 and time data is optionally returned to the Web server 72.

Detailed Chronological Description

The following paragraphs provide exemplary details of one exemplary method by which the present invention may be implemented. Alternate methods could be developed by those skilled in the art to implement the basic concepts of the present invention. These details will be addressed in substantially the same order in which they were discussed in relation to FIGS. 3A-3C and 8.

First, it should be noted that the present invention may be implemented on the World Wide Web service on the Internet or other analogous network service in an alternate network environment (e.g. a telephone network or a television network). The term Web server 22 is meant to be broadly construed to be applicable to alternate network environments. Details of opening and maintaining a network connection, selecting the appropriate actions for various uniform resource indicators, content negotiation, and transaction logging handled by the existing Web server system, however, are meant to be exemplary as such protocols may or may not be necessary in alternate network environments.

As shown in FIGS. 3A-3C., the functions of the Web server 22 may be divided into the three Web services: the script handler 42 (FIG. 4), the event handler 44 (FIG. 5), and the focus handler 46. These services may be implemented as separate processes by a Web server (as shown), as a single process, or as any number of processes on any number of servers. These services may also be implemented by the client's system or on the viewer's media. These services are similar in some functions, but there are differences in which portion of a single transaction each service handles. For example, each service can read its state from the information and cookies present in the HTTP connection headers. Each service can retrieve account information from a relational database about the requesting client 20. Each service may transmit statistical packets to a caching statistical collation module, referred to as the "count daemon" 48 (detailed in FIG. 7), and then may deliver an appropriate response to the post-session Web browser. The response can also optionally include state and status information about the post-session Web browser in the form of cookies. These services will be discussed individually in the order they appear in the system as shown and described in FIGS. 3A-3C and 8.

Adding Post Session Code. In order to activate the method of the present invention, a client 20 obtains post-session instructions from a Web Server 22 and adds them to its display 34. In one exemplary preferred embodiment, the post-session instructions are post-session HTML code that a client 20 adds to its Web pages. In an alternative preferred embodiment, the post-session instructions are post-session XML code that a client 20 adds to its Web pages.

Viewer Opens a Platform. A viewer 26 opens a client's 20 display 34 with a foreground platform 32. In one preferred embodiment, a viewer 26 opens a client's 20 Web page with a Web browser.

Script Code Delivery. As shown in FIG. 3A, when a viewer 26 opens a client's 20 display 34 with a foreground platform 32, the post-session instructions that the client 20 added to its display 34 cause the foreground platform 32 to download 43a, 43b a post-session procedure from the Web server 22. In one exemplary preferred embodiment the post-session procedure downloaded from the Web server 22 to the platform 32 is script code. In one preferred embodiment, the client's account number is encoded directly into foreground platform's 32 request for a post-session procedure so that proper credit is given to the client 20 for bringing in traffic to the system of the present invention, for verification, and/or for determining the appropriate category of advertisement to return.

Script Handler. In the exemplary preferred embodiment shown in FIGS. 3A and 4, when a viewer requests a display 34 to which post-session HTML code has been added, a request for a post-session procedure 43a is sent to the script handler 42. The time at which the request for the post-session procedure is made is preferably recorded, noted, and/or stored. In addition, the script handler 42 may verify that the account number present in the requesting link is valid. The script handler 42 then returns a post-session procedure 43b to the platform 32.

Figure 4:
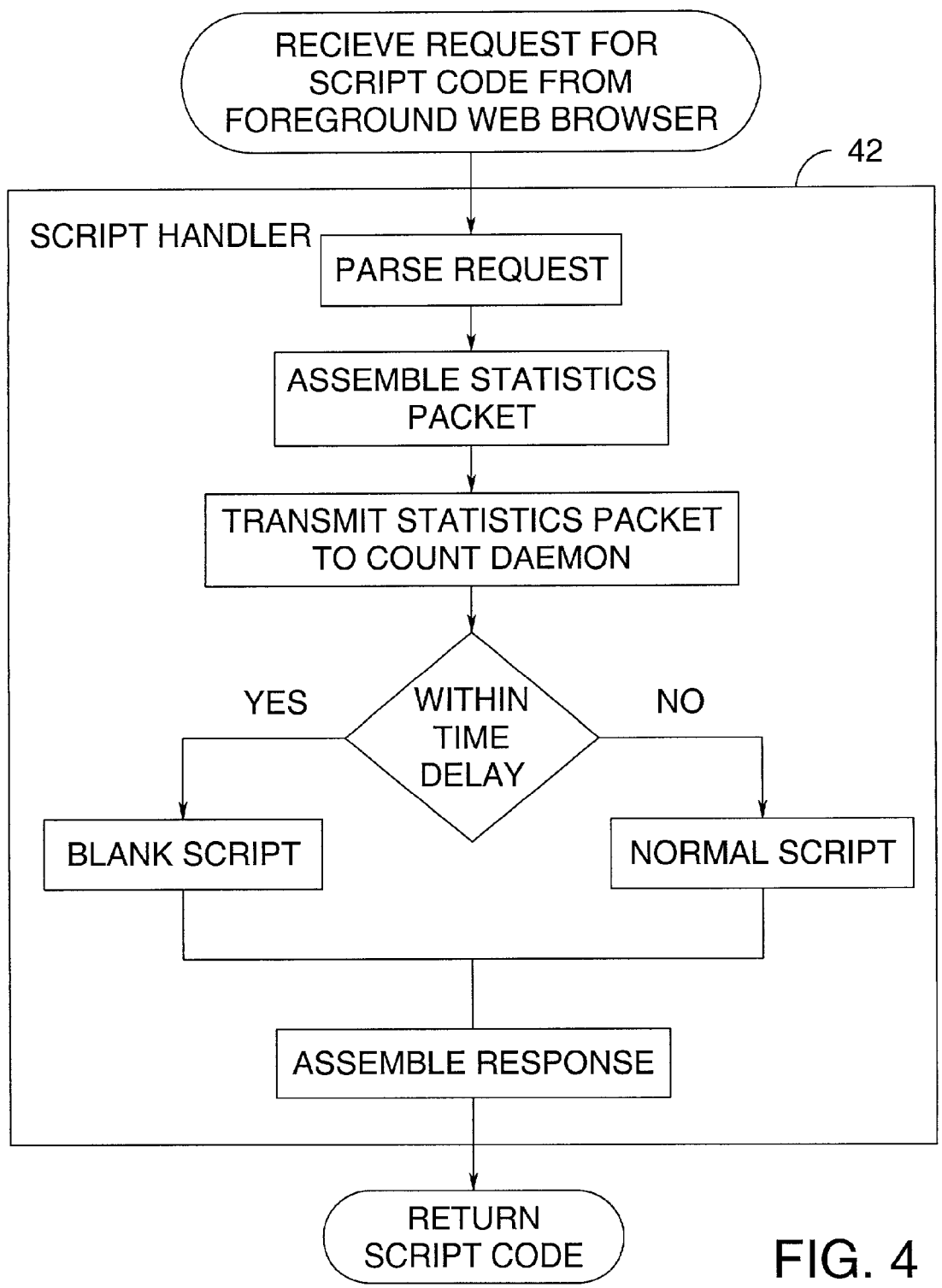
FIG. 4 is a flow diagram of the script handler of an exemplary preferred embodiment the post-session Internet advertising system of the present invention.

As illustrated in the exemplary embodiment of FIG. 4, the script handler 42 may parse each request and assemble statistics packets for transmission to the count daemon 48. If a viewer subsequently requests a second client Web page, a second request for script code is sent to the script handler 42. Using the time data that has been recorded, noted, and/or stored, the length of time that has elapsed between the initial and subsequent requests is determined. The script handler 42 determines if the elapsed time is longer or shorter than a specified time period ("time window"). If the elapsed time is shorter than the time window, script code specifying that no operations are to be performed is returned (blank script). If the elapsed time is longer than the time window, normal script code is returned. Finally, a response is assembled and returned to the viewer's foreground platform 32.

The reason for determining whether a second request for script code is made within a time window is to provide the viewer with a reasonable opportunity to view a display before replacing it with a new display. If a viewer requests a second Web page to which the same client's (or, in an alternate embodiment, any client's) post-session HTML code has been added, a load triggering event occurs. If this load triggering event occurs within the time window, a request for script code will result in blank script code being returned. In other words, the viewer is not sent a second display. On the other hand, if this load triggering event occurs after the time window, the viewer will be sent a second display to replace the first unseen display.

It should be noted that, although an optional feature of the present invention, this process of replacing unseen displays can be very strategic. Viewers tend to dislike being flooded with displays such as advertising. Where a single display causes the viewer to examine its content, multiple displays tend to aggravate the viewer. Accordingly, although the scope of the invention clearly includes opening multiple platforms with multiple displays, the preferred embodiment is to allow only a single post-session platform.

It should also be noted that the "time window" could be replaced by a "hit counter" in which the replacement is not done for a certain number of hits. Alternately, there could be a ranking system in which clients/displays with higher rankings (perhaps paying versus unpaying clients/displays) cannot be replaced by clients/displays with lower rankings. These alternatives are meant to be exemplary and not to limit the scope of the invention.

Load Triggering Event. At some point while viewing the display 34, the viewer activates a load triggering event. Load triggering events may include, for example, the viewer leaving or exiting the specific display 34 or the viewer closing the foreground platform 32. Exemplary alternative load triggering events may include clicking on an off-site link or entering a new address in a dialogue box, time delay, load, unload, click, resize, submit, focus, blur, drag, key press (including a mouse button key), select, change (contents of a form field), refresh, open, close, redirect, enter, exit, move, minimize, maximize, end of program, beginning of program, beginning of session, end of session, "switching services," or change of service. These load triggering events are meant to be exemplary.

Additional Load Triggering Events. In one exemplary preferred embodiment, if a first load triggering event is followed by a second load triggering event, a second post-session platform 24 is opened and sent to the background. In an alternative preferred embodiment, a second post-session platform is not opened. In an additional preferred embodiment, if a first load triggering event is followed by a second load triggering event, a second post-session window is opened only if the time period between load triggering events is longer than a predetermined time period.

Post-Session Procedure. The post-session procedure consists of a set of actions to be taken in response to the load triggering event. The post-session procedure causes no immediate visible change to the foreground display 34, but when the load triggering event occurs, a new platform (post-session platform 24) opens and is immediately sent to the background. The post-session platform 24 may be a full sized window or any other sized window.

Figure 5:
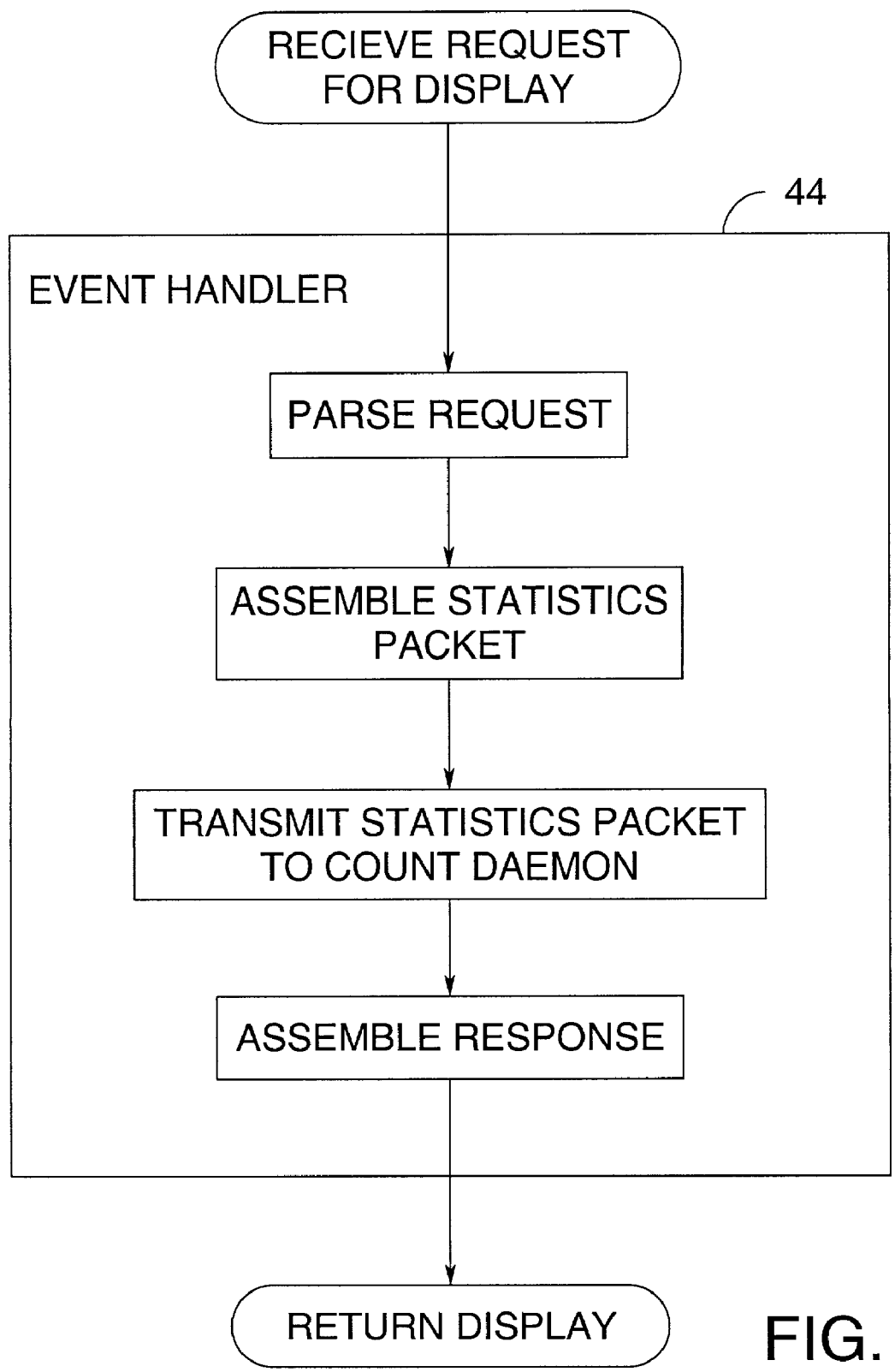
FIG. 5 is a flow diagram of the event handler of an exemplary preferred embodiment the post-session Internet advertising system of the present invention.

Event Handler. As shown in FIGS. 3B and 5, the event handler 44 is invoked by a request for a display link 45a by the newly opened post-session Web browser. The event handler 44 chooses and delivers a link to a client's Web site 45b. In one preferred embodiment, the event handler delivers a link to an HTML frameset. There is no requirement, however, that the post-session browser link to HTML code. In alternative preferred embodiments, the post-session browser links to any form of network content including sound, animation, streaming video, or any other form of rich media. In one preferred embodiment, the event handler 44 delivers links to automatically load the focus timer 45c. As shown in FIG. 5, the event handler 44 parses a request and assembles statistics packets which it then transmits to the count daemon 48. A response is assembled and returned to the platform 24.

The post-session procedure downloaded from the Web server 22 to the platform 32 may be written in any supported scripting language, such as JavaScript or VBscript. In an exemplary preferred embodiment, the post-session procedure is an advertising session consisting of opening a post-session platform 24, linking to the Web server 22, sending the post-session platform 24 to the background (or conversely, bringing the viewer's platform to the foreground), and optionally loading a process used for tracking focus time. In other words, one preferred embodiment of the present invention uses the load triggering event to trigger an advertising session.

Figure 9:
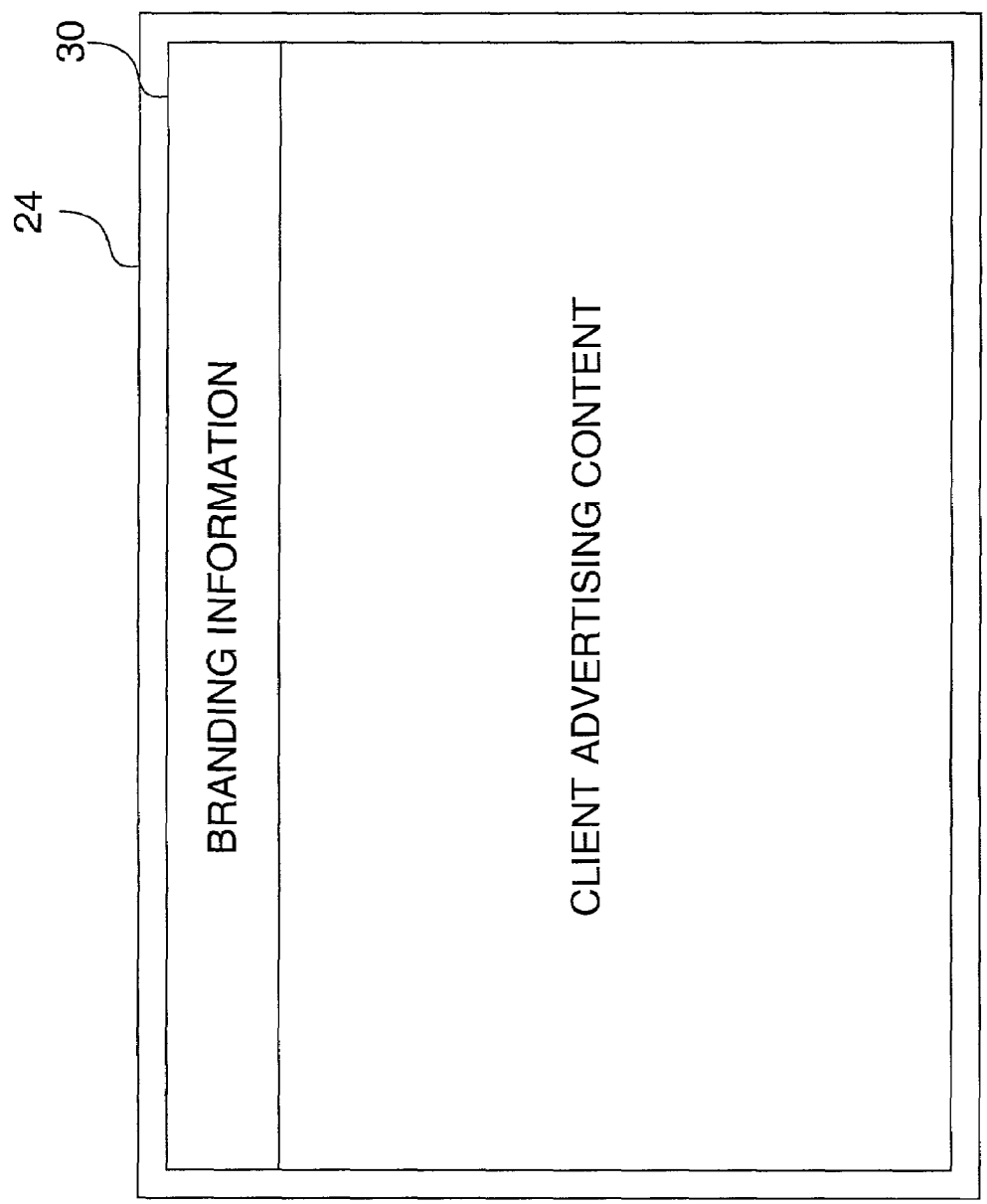
FIG. 9 shows an exemplary screen view of a frameset displaying branding information in an upper frame and client advertising content in a lower frame in one preferred embodiment of the present invention.

Post-Session Platform. As shown in FIGS. 3B and 3C, the post-session platform 24 requests from the Web server 22 the address of display 30. In one preferred embodiment, the address of display 30 is the client 20. In alternative embodiments, the address may be, for example, other clients or the Web server. When display 30 is returned, the post-session platform 24 displays display 30. In one preferred embodiment, display 30 is advertising content for a client 20. In an alternative preferred embodiment, display 30 is a Web site or Web page of a client 20. In one preferred embodiment, as shown in FIG. 9, the post-session platform 24 shows the display 30 in a frameset with branding information of the Web server 22 in one frame and client advertising content in another frame.

In one preferred embodiment, the post-session platform 24 is a default browser window of the same type as the current foreground platform 32. One alternate embodiment could have a specific viewer-specified default platform. Another alternate embodiment could use a default platform predetermined by the client 20, Web server 22, or the specific type of display.

View Triggering Event. At some point after viewing the display 34, the viewer activates a view triggering event. View triggering events may include, for example, the viewer closing the foreground platform 32, the viewer selecting the post-session platform 24 from the task bar at the bottom of a media screen or an alternative menu structure, or the viewer minimizing or moving the foreground platform 32. Exemplary view triggering events could include clicking on an off-site link or entering a new address in a dialogue box, load, unload, click, resize, submit, focus, blur, drag, key press (including a mouse button key), select, change (contents of a field), refresh, open, close, redirect, enter, exit, maximize, end of program, beginning of program, beginning of session, end of session, "switching services," or change of service. Still other view triggering events may be time controlled. These view triggering events are meant to be exemplary.

It should be recognized from the exemplary view triggering events set out in the preceding paragraph that one feature of a view triggering event is that it is preferably viewer driven. While a view triggering event is initiated by viewer action, a time delay may also be an aspect of a view triggering event. For example, a viewer may initiate a view triggering event by clicking an off-site link, but the set of actions to be taken in response to the view triggering event may not occur for a pre-determined time period. In other words, the view triggering event may be time delayed.

Figure 6:
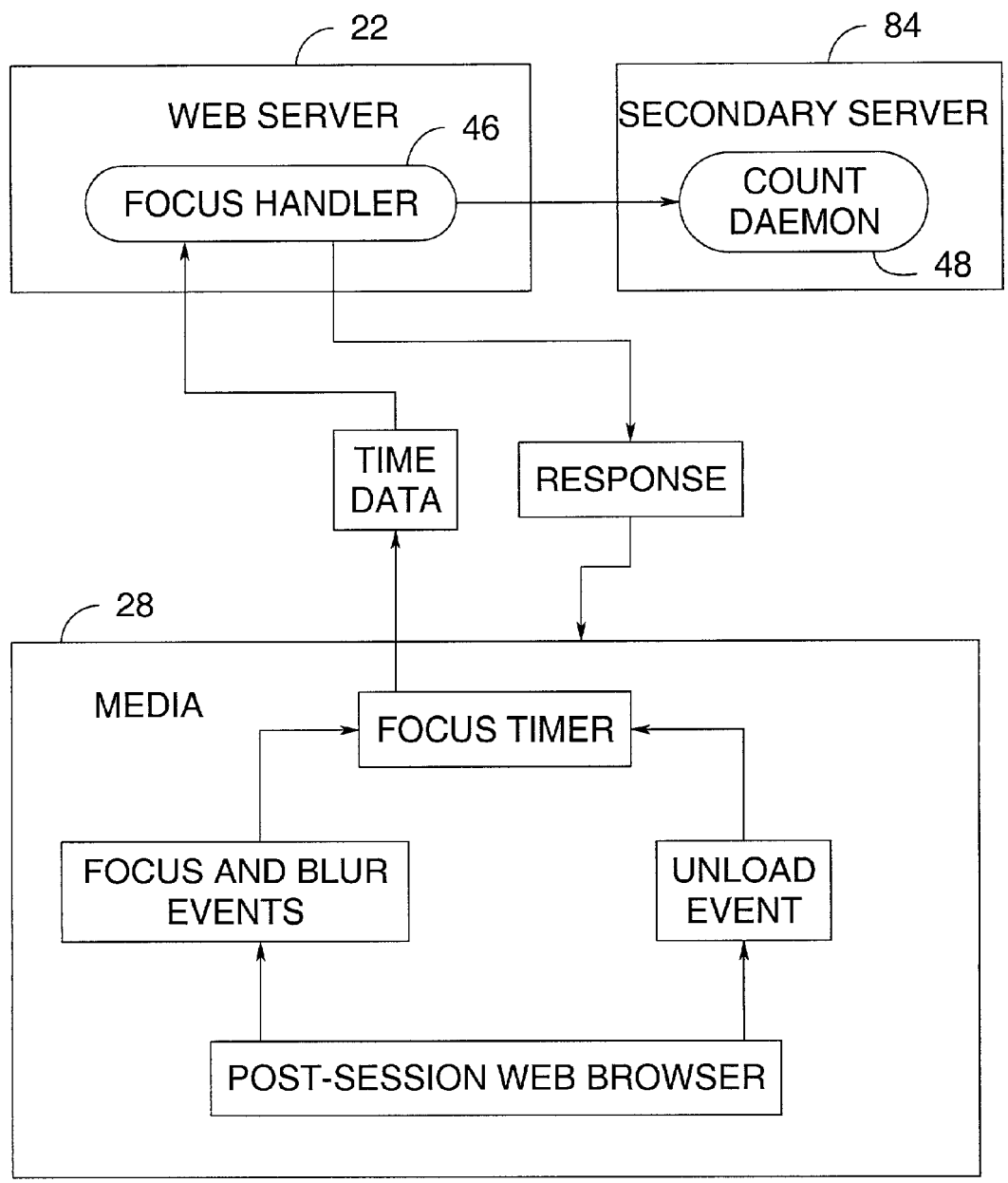
FIG. 6 is a block diagram showing data flow of an exemplary preferred embodiment of a focus handler, media, and the count daemon of the post-session Internet advertising system of the present invention.

Post-Session Timer. As shown in FIGS. 3B and 6, in one preferred embodiment, the post-session procedure optionally includes the loading of a process used for tracking focus time. When the display 30 on the post-session platform 24 changes or the platform 24 is closed, the focus timer process returns time data to the Web server 22 or secondary server 84. The duration of time that the post-session platform spends in the foreground, and thus being viewed, is tracked. In the embodiment shown in FIGS. 3B, 3C, and 6, a focus timer is optionally delivered to a post-session Web browser by the event handler 44 and time data 47 is optionally returned to a focus handler 46. In an alternative preferred embodiment, the focus timer is incorporated into a post-session platform (the focus timer being implemented as a Java applet embedded in the frameset). The focus timer is linked to the post-session Web browser and monitors the activation of focus and blur events, signifying that the post-session Web browser has been brought to the foreground, sent to the background, or closed. In one preferred embodiment, the focus timer is incorporated into the post-session Web browser. It should be noted that while the focus timer process may only track the time period between when a post-session platform is brought to the foreground to when the post-session platform is closed, it may track time periods pertaining to other events relevant to a client. In one preferred embodiment, the focus timer process may track the length of the time the post-session platform is in the foreground although a viewer may bring a post-session platform to the foreground and return it to the background multiple times before the viewer ultimately closes the platform. In another alternative embodiment, the focus timer process tracks the length of time the post-session browser spends in the background.

Focus Handler. As shown in FIGS. 3C and 6, the focus handler 46 receives time data 47 from the focus timer and transmits statistical packets to the count daemon 48 to track the focus time for a display 30 displayed in a post-session platform 24. In an exemplary shown embodiment, the focus handler 46 performs only minimal data lookup and returns a response to the focus timer that indicates that no content body follows.

Figure 7:
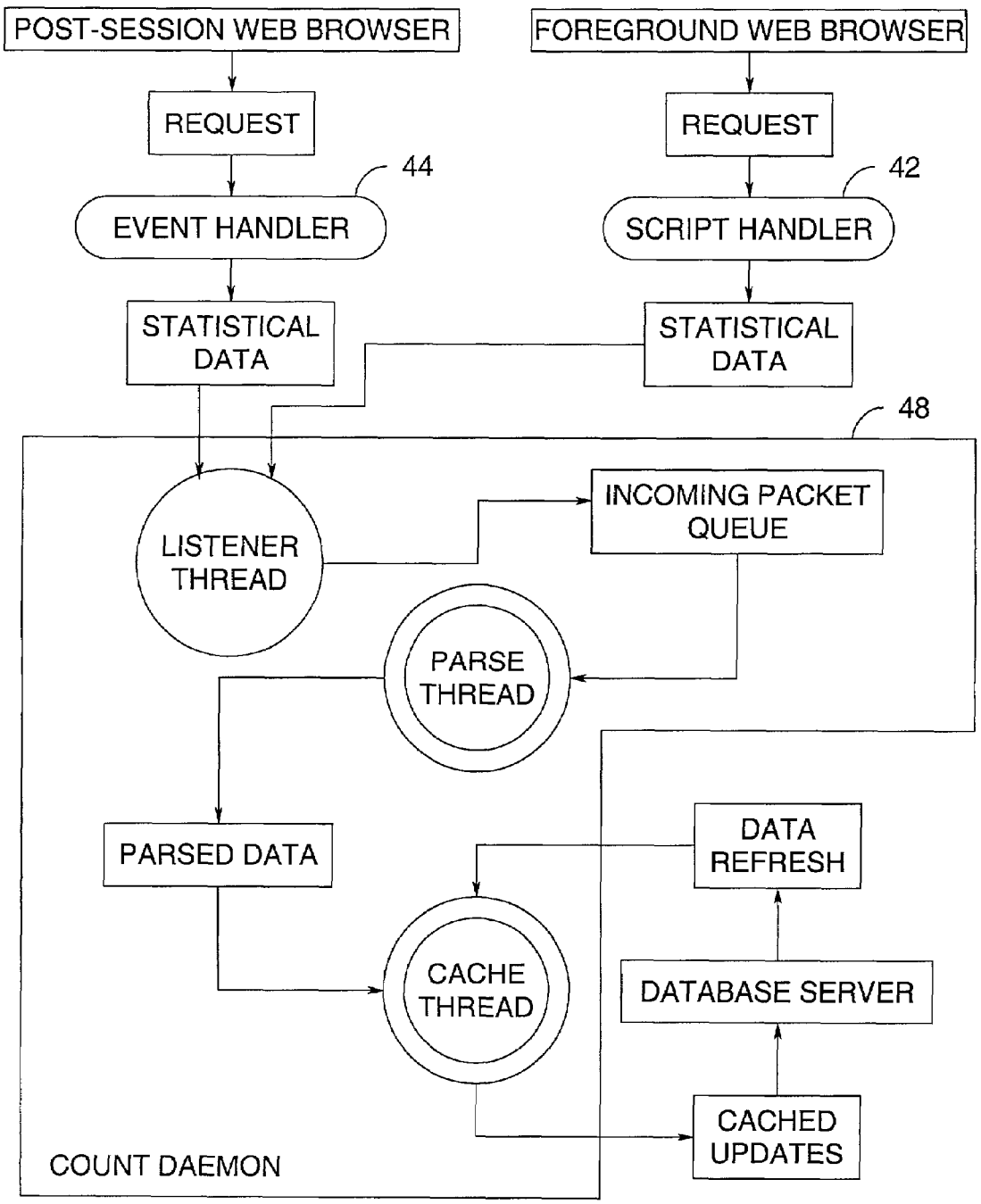
FIG. 7 is a block diagram showing the data path to and the thread components and data path within the count daemon of an exemplary preferred embodiment the post-session Internet advertising system of the present invention.

Count Daemon. As shown in FIGS. 3C and 7, the count daemon 48 receives statistics packets from the script handler 42, the event handler 44, and the focus handler 46 and collates statistical data. This reduces the load on the relational database. In an exemplary preferred embodiment, the count daemon 48 is implemented with three simultaneously operating processes, or "threads": the listener, parse and cache threads.

As shown in FIG. 7, the listener thread accepts packets from the network and inserts them into a queue. In one preferred embodiment, a plurality of listener threads each listen at a separate network address so that statistics for a plurality of services can be simultaneously collated by a single count daemon 48. The parse thread reads and analyzes the packets in the queue. In one preferred embodiment, the parse thread uses standard reference libraries for the parsing of XML. This advantageously reduces the complexity of processing. The cache thread reads and performs maintenance on the parsed packets as described below.

As will be recognized by one skilled in the art, a parsed statistical packet represents all of the different pieces of information included in a single page load on a Web server. A single hit can have the effect of causing in excess of 40 individual values in the relational database to incremented. With daily hit quantities in the millions, directly updating a relational database would quickly overwhelm the capacity of the database storage media. In one preferred embodiment, the cache thread is implemented as follows: First, the cache data structures are abstracted to appear programmatically as simple data structures; second, each cache is configured with a maximum number of elements; third, when a cache member is requested that is not within the cache's current dataset, a request is made transparently to the database for the data corresponding to the specified key; fourth, if this action would cause the cache to have too many elements, the least recently used element is flushed (i.e., any changes are committed to the database) and deleted; and fifth, changed data items throughout the entire cache are periodically flushed. This embodiment is particularly advantageous where efficient use of the database storage media is desired.

The rationale for using this kind of caching scheme is based on the proportional distribution of hits per day. For example, a "busy" client Web site may receive 432,000 hits/day or 5 hits/second; an "average" client Web site may receive 86,400 hits/day, or 1 hit/second; and a "slow" client Web site may receive 2,880 hits/day or 0.033 hits/second. If the Web server of the present invention receives a 10 hits/second as a result of viewers accessing client Web sites, the distribution of hits received attributable to the busy, average, and slow Web sites is 50%, 10%, and 3.33%, respectively. If data is cached and flushed at a rate of 1 flush per minute instead updating of the database each time a hit is received, then the database load and network traffic are reduced by a factor of 600, 120, and 2 for the busy, moderate, and slow Web sites, respectively.

Post-Session Database. In one preferred embodiment, the present invention includes a relational database for storing member account information and statistical data on focus time.

Alternative Media

FIGS. 4 to 7, and 9 show one exemplary preferred embodiment of the present invention that uses computers and the Web. This exemplary preferred embodiment is explained in greater detail above.

The present invention is well suited to alternative media such as a telephone. For example, a viewer 26 may request a display 34 from a client 20 airline using as media 28 the viewer's telephone. The display 34 consists of the audio communication interface (which may be an actual person or an automated voice response unit) provided by the client 20 airline and the foreground platform 32 consists of a telephone circuit. In this example, the viewer's 26 request for an audio communication interface (e.g., dialing) from the client 20 airline is a load triggering event that causes a post-session procedure to be delivered to media 28 (e.g., the viewer's telephone). When the view triggering event (e.g., hanging up the phone) occurs, the audio communication advertisement is brought to the foreground (e.g., an automatic call back feature) and played. In this example, the post-session procedure requests a post-session platform (a second telephone circuit) which in turn requests a display 30. In this example, display 30 might be an audio communication advertisement provided by a client 20 rental car company or an audio communication advertisement provided by a client 20 lodging provider. The post-session second telephone circuit is sent to the background and does not disrupt the viewer's 26 perception of the audio communication interface 32. It should be noted that the telephone media might not actually be sent to the background, but could wait to run in the background until the view triggering event occurs.

Another alternative media is television. For example, a viewer 26 requests a display 34 from a client 20 television broadcaster using television as media 28. The display 34 consists of broadcast content, such as a television program and the foreground platform 32 consists of a television channel. In this example, the viewer's 26 request for display 34 (e.g., television program) is a load triggering event that causes a post-session procedure to be delivered to media 28 (e.g., the interactive television). A view triggering event occurs when the viewer changes the display 34 (e.g., broadcast context), and as a result a post-session platform 24 (e.g., television channel) is brought to the foreground. (It should be noted that the post-session procedure, in this example, causes the post-session platform to be opened upon and sent to the background upon a load triggering event.) In this example, post-session display 30 may consist of an advertisement that is presented within the post-session platform 24.

ALTERNATIVE EMBODIMENTS

Although the present invention has been discussed in terms of the Internet, alternative media is also contemplated within the scope of the invention. For example, as shown in the exemplary embodiments discussed above, interactive television and wireless communication devices would be ideally suited to the method described in this disclosure. Further, although the terms "Web server," "Web site," and "Web page," are used throughout this disclosure, they are used in the generic sense and are not meant to exclude their equivalent as associated with intranets, LANs, WANS, or alternate media.

Alternative embodiments could be developed in which the order of the operations is changed. For example, the function of the script handler 42 may be carried out after the load triggering event. Another example would be one in which the function of the event handler 44 is carried out after the view triggering event. Yet another example would be combining the functions of the script and event handlers so that the post-session platform is opened and sent to the background by the "script handler" prior to the load triggering event. Still another example is one in which the entire system is delayed for a significant period so that the post-session platform and display 24, 30 do not become visible for a predetermined time, a predetermined number of view triggering events, or a specific type of triggering event. The invention could also be implemented by having the post-session platform and display 24, 30 come to the foreground after a predetermined period of time (for example, thirty minutes or two hours), a predetermined number of view triggering events, or a specific type of triggering event.

Although the present invention has been discussed as a sequence of steps as shown in FIG. 8, it is contemplated that the functions of the shown steps could be combined into a smaller number of steps or could be expanded to include additional steps and sub-steps. In one preferred embodiment, the functions of opening and sending to the background a post-session platform and display may be performed in a single step.

It should be noted that although FIG. 1 shows a single client 20, it should be noted that an alternative preferred embodiment contemplates multiple clients. For example, the present invention may be used with a collection of independent Web sites related by a common theme (e.g. Web sites featuring Thai cooking, a Thai restaurant, travel to Thailand, the Thai language, the Thai religion, and Thailand). The present invention may also be used with a network of related sites. For example, a commercial enterprise with several lines of business may have a Web site for each line of business, such as food products, cooking supplies, a travel agency, and a book seller. These commonly owned Web sites featuring different topics could jointly use the present invention.

It should be noted that in one preferred embodiment, a client 20 registers to use the system by accessing a Web server 22. A client 20 registering to use the present invention provides the Web server 22 with information such as client name, company name, address, e-mail address, telephone address, line of business, planned advertising budget, estimated daily traffic, Web site information, and other similar information. In a first alternate preferred embodiment, a client 20 uses the present invention without registering. In a second alternate preferred embodiment, a client 20 uses the present invention for free. In another preferred embodiment, the client 20 registers for a fee.

As has been discussed above, a load triggering event causes a post-session platform to be opened and immediately sent to the background. It should be understood that the term "immediately" ideally means instantaneously or without any perceptible time delay. But this term may also mean a momentary time delay that is perceptible so long as the delay does not disturb the viewer's viewing experience.

As shown in FIG. 8, a load triggering event 58 causes a post-session platform to open 60 and also causes the post-session platform to request a post-session display 62. In one preferred embodiment, the event handler 44 returns a link to a single post-session display 45*b*, 64. In alternative embodiments, the post-session display may be refreshed one or more times. In other words, the event handler may deliver multiple links to the post-session platform that are downloaded at periodic intervals while the post-session platform remains in the background. In these alternative embodiments, the post-session display may be refreshed even though a new load triggering event has not occurred.

The terms and expressions that have been employed in the foregoing specification are used as terms of description and not of limitation and are not intended to exclude equivalents of the features shown and described or portions of them. The scope of the invention is defined and limited only by the claims that follow.

What is claimed is:

1. A system for Internet advertising capable of simultaneously maintaining a foreground window and at least one background window and capable of displaying a first browser in a said foreground window for selectively browsing the Internet, said system comprising:
   (a) a device that interacts with a display to display to a user at least one browser, each said at least one browser within a respective window;
   (b) a script handler that invokes a post-session procedure in said first browser, said post-session procedure opening a second browser in a said background window such that said opening is free from said background window obscuring any portion of said foreground window while said first browser is simultaneously displayed in said foreground window; and
   (c) an event handler that receives, from an Internet address, a link to an advertisement and loads said advertisement into said second browser while said second browser is in a said background window, said event handler maintaining said second browser in said background window until the occurrence of a user-initiated action made after said second browser is opened in said background window, said event handler being free from instructions capable of automatically, without user interaction, causing said second browser in said background window to replace said first browser as said foreground window such that said first browser is then maintained in a background window at least partially behind said second browser, during a time interval beginning incrementally before said advertisement has completely finished loading in said second browser and ending at a time incrementally after a user action navigates said first browser to a different web site than that loaded in said first browser when said event handler received said advertisement.

2. The system of claim 1 where said second browser is opened in response to a load-triggering event.

3. The system of claim 2 where said load-triggering event comprises at least one of:
   (a) clicking on an off-site link;
   (b) entering a new address;
   (c) refreshing a web site;
   (d) exiting a web site; and
   (e) being redirected to a web site.

4. The system of claim 2 where said script handler delays invocation of said post-session procedure for a predetermined time period.

5. The system of claim 4 where said script handler cancels invocation of said post-session procedure if a user loads a new web site in said first browser before said predetermined time period has elapsed.

6. The system of claim 1 where said second browser is displayed in a foreground window after the occurrence of a view-triggering event.

7. The system of claim 6 including a focus timer that tracks the duration that said second browser is displayed in said foreground window.

8. The system of claim 1 where said media comprises one of a computer, a PDA, a cell phone, and a television.

9. The system of claim 1 where said event handler selects and returns one of a plurality of advertisements maintained at said Internet address.

10. The system of claim 9 capable of opening a plurality of second browsers, each maintained in a separate said background window, said event handler capable of receiving a link to an advertisement for each said second browser and loading a respective said advertisement into each said second browser while each said second browser remains in its respective said background window.

11. A post-session advertising method for use in a media capable of simultaneously maintaining a background window and a foreground window, said method comprising the steps of:
   (a) embedding post-session instructions into a first browser, said first browser for being displayed in said foreground window;
   (b) said post-session instructions opening a second browser in said background window such that said opening is free from said background window obscuring any portion of said foreground window while said first browser is being displayed in said foreground window;
   (c) said post-session instructions receiving, from an Internet address, a link to an advertisement; and
   (d) loading said advertisement into said second browser while said second browser is in said background window, wherein said post-session instructions are free from instructions capable of automatically, without user interaction, causing said second browser in said background window to replace said first browser as said foreground window such that said first browser is then maintained in a background window at least partially behind said second browser, during a time interval beginning incrementally before said advertisement has completely finished loading in said second browser and ending at a time incrementally after a user action navigates said first browser to a different web site than that loaded in said first browser when said event handler received said advertisement.

12. The method of claim 11 where said second browser is opened in response to a load-triggering event.

13. The method of claim 12 where said load-triggering event comprises at least one of:
   (a) clicking on an off-site link;
   (b) entering a new address;
   (c) refreshing a web site;
   (d) exiting a web site; and
   (e) being redirected to a web site.

14. The method of claim 12 where implementation of said post-session instructions is delayed for a predetermined time period.

15. The method of claim 14 where implementation of said post-session instructions is canceled if a user loads a new web site in said first browser before said predetermined time period has elapsed.

16. The method of claim 11 where said second browser is displayed in a foreground window after the occurrence of a view-triggering event.

17. The method of claim 16 including the step of tracking the duration that said second browser is displayed in said foreground window.

18. The method of claim 11 where said media comprises one of a computer, a PDA, a cell phone, and a television.

19. The method of claim 11 where an event handler selects and returns one of a plurality of advertisements maintained at said Internet address.

20. The method of claim 19 where a plurality of second browsers are opened, each maintained in a separate said background window, and a link is received to an advertisement for each said second browser and a respective said advertisement being loaded into each said second browser while each said second browser remains in its respective said background window.

21. A system for Internet advertising capable of simultaneously maintaining a foreground window and at least one background window and capable of displaying a first browser in a said foreground window for selectively browsing the Internet, said system comprising a device that interacts with a display to display to a user at least one browser, each said at least one browser within a respective window, and a script handler that invokes a post-session procedure in said first browser, said post-session procedure opening an advertisement in a second browser and maintaining, said second browser in a said background window while said first browser is simultaneously displayed in said foreground window, said post-session procedure being free from instructions capable of automatically, without user interaction, causing said second browser in said background window to replace said first browser as said foreground window such that said first browser is then maintained in a background window at least partially behind said second browser, during a time interval beginning incrementally before said advertisement has completely finished loading in said second browser and ending at a time incrementally after a user action navigates said first browser to a different web site than that loaded in said first browser when said event handler received said advertisement.

22. The system of claim 21 where said script handler comprises code in a web page displayed in said first browser.

* * * * *

UNITED STATES PATENT AND TRADEMARK OFFICE
CERTIFICATE OF CORRECTION

| | | |
|---|---|---|
| PATENT NO. | : 7,353,229 B2 | Page 1 of 1 |
| APPLICATION NO. | : 09/866425 | |
| DATED | : April 1, 2008 | |
| INVENTOR(S) | : Andrew Vilcauskas, Jr. et al. | |

It is certified that error appears in the above-identified patent and that said Letters Patent is hereby corrected as shown below:

Col. 15, Line 56

Change "where said media comprises" to read --where said device comprises--.

Col. 16, Line 30

Change "event handler received said advertisement" to read --post-session instructions received said link to said advertisement--.

Col. 17, Lines 7-8

Change "and maintaining, said second" to read --and maintaining said second--.

Col. 18, Lines 7-8

Change "when said event handler received said advertisement." to read --when said post-session procedure opened said advertisement.--

Signed and Sealed this

First Day of June, 2010

David J. Kappos
*Director of the United States Patent and Trademark Office*